(12) United States Patent
Nakanishi et al.

(10) Patent No.: US 12,602,492 B2
(45) Date of Patent: Apr. 14, 2026

(54) MEMORY SYSTEM AND CONTROL METHOD

(71) Applicant: Kioxia Corporation, Tokyo (JP)

(72) Inventors: Keiri Nakanishi, Kawasaki Kanagawa (JP); Takaya Ogawa, Kawasaki Kanagawa (JP); Takashi Takemoto, Yokohama Kanagawa (JP); Kohei Oikawa, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 123 days.

(21) Appl. No.: 18/743,458

(22) Filed: Jun. 14, 2024

(65) Prior Publication Data

US 2025/0013759 A1 Jan. 9, 2025

(30) Foreign Application Priority Data

Jul. 4, 2023 (JP) ................................. 2023-109957

(51) Int. Cl.
*G06F 21/60* (2013.01)
(52) U.S. Cl.
CPC ................................. *G06F 21/602* (2013.01)

(58) Field of Classification Search
CPC ..................................................... G06F 21/602
See application file for complete search history.

(56) References Cited

U.S. PATENT DOCUMENTS

| | | | |
|---|---|---|---|
| 2016/0011972 A1 | 1/2016 | Flynn et al. | |
| 2019/0004843 A1* | 1/2019 | Durham | H04L 63/0471 |
| 2022/0245043 A1* | 8/2022 | Jones | G06F 11/3466 |
| 2022/0377013 A1 | 11/2022 | Doddapaneni et al. | |
| 2022/0377027 A1 | 11/2022 | Gai et al. | |

OTHER PUBLICATIONS

Zhang et al., "Painlessly Realizing Transparent Compression over Disaggregated Infrastructure", Flash Memory Summit. 2022, pp. 1-14.

* cited by examiner

*Primary Examiner* — Sangseok Park
(74) *Attorney, Agent, or Firm* — XSENSUS LLP

(57) ABSTRACT

A controller of a memory system includes circuitry that generates a first compression unit that is calculated based on first namespace setting information indicating setting of a write-destination namespace, and corresponds to the write-destination namespace. The first compression unit has a size satisfying a constraint that an encryption key for encrypting data to be written into the write-destination namespace is not switched in the first compression unit.

20 Claims, 23 Drawing Sheets

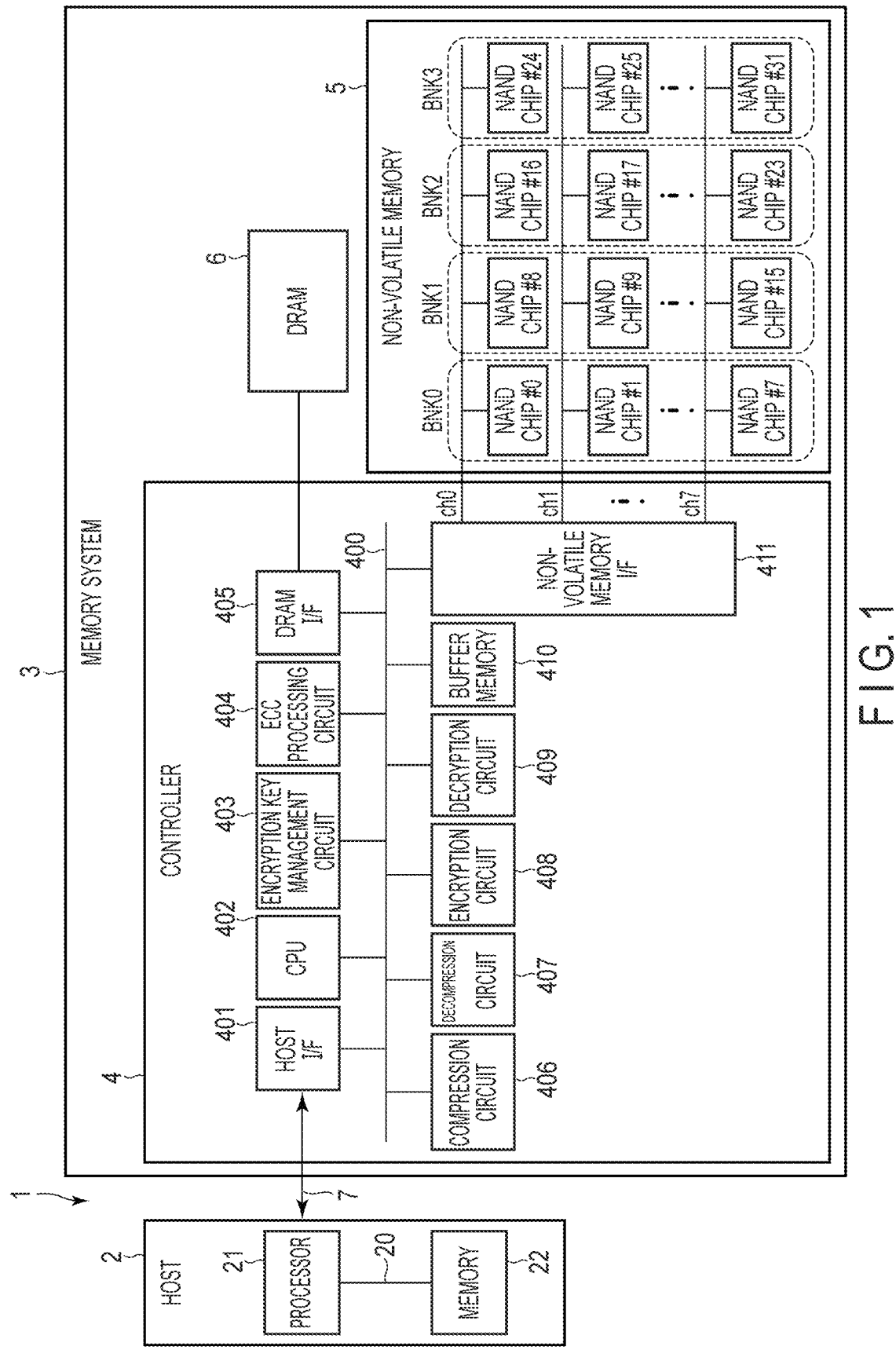
F I G. 1

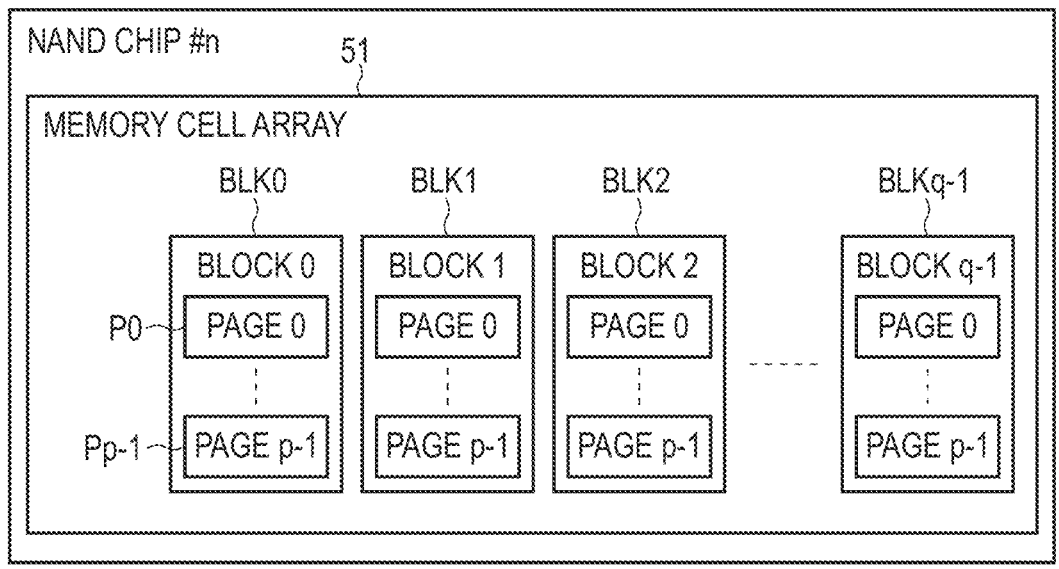
F I G. 2
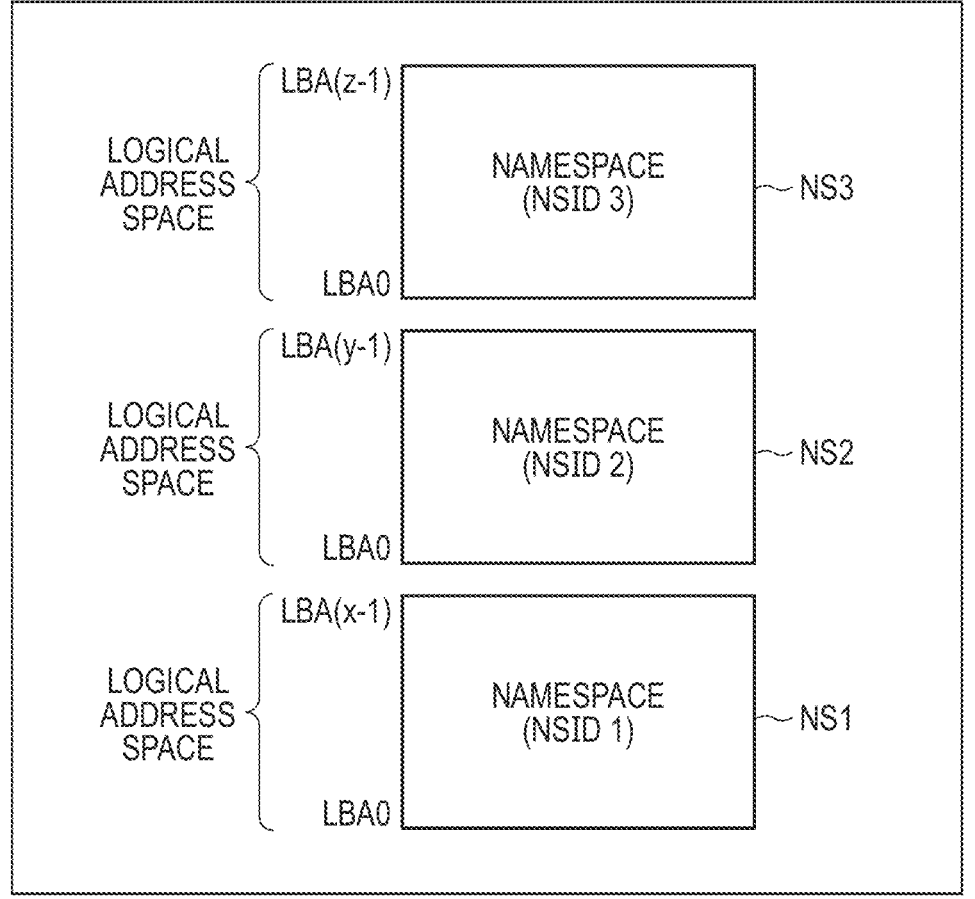
F I G. 3

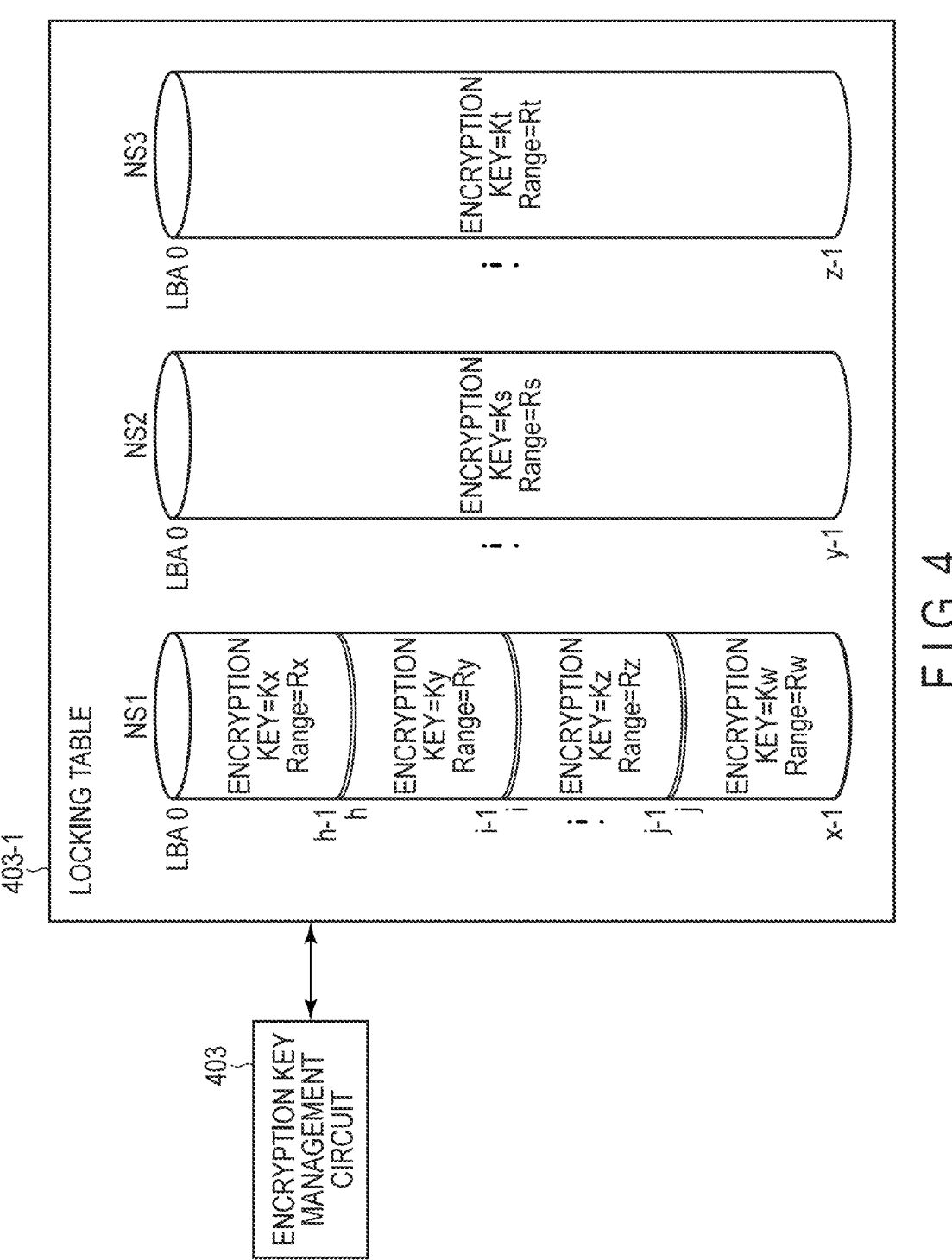
F I G. 4

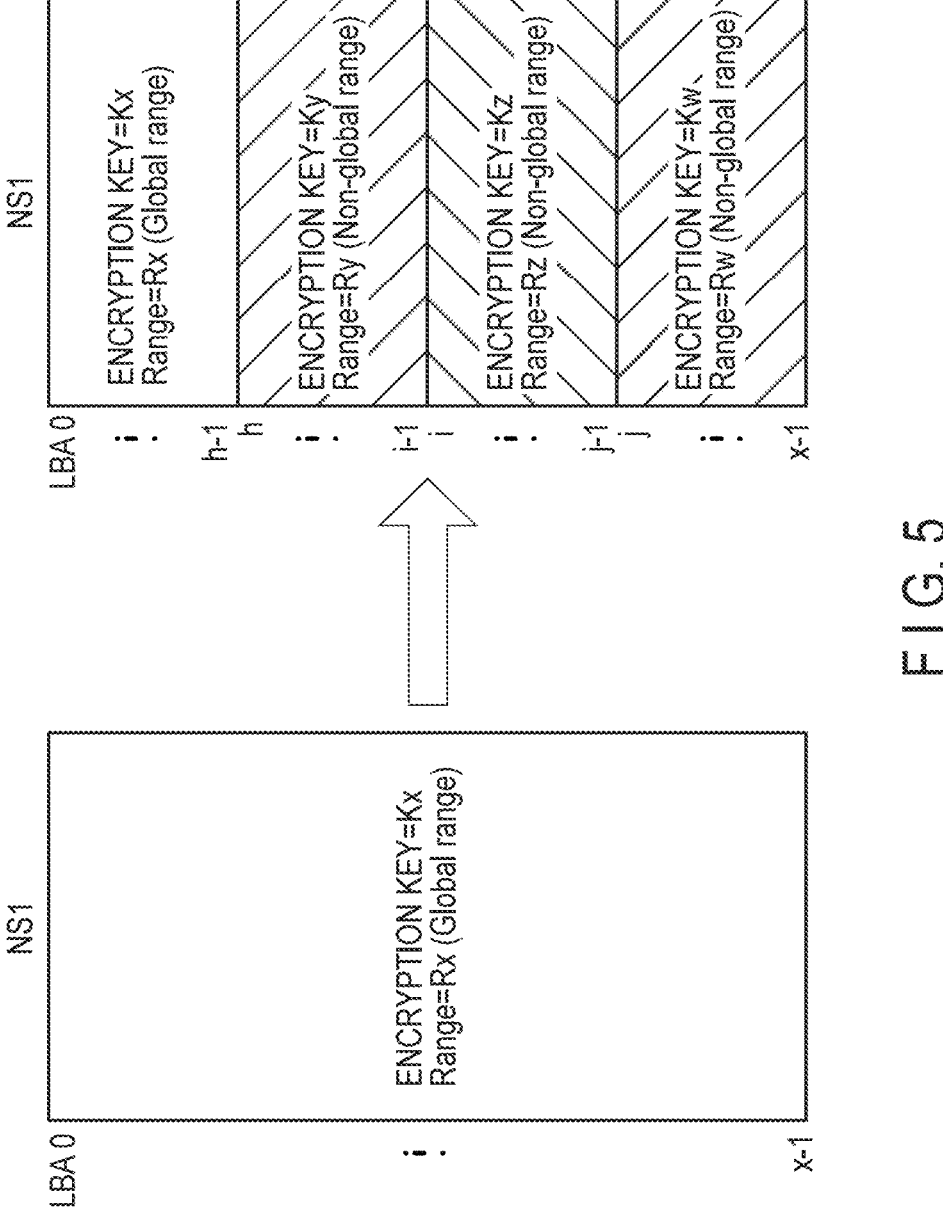
F I G. 5

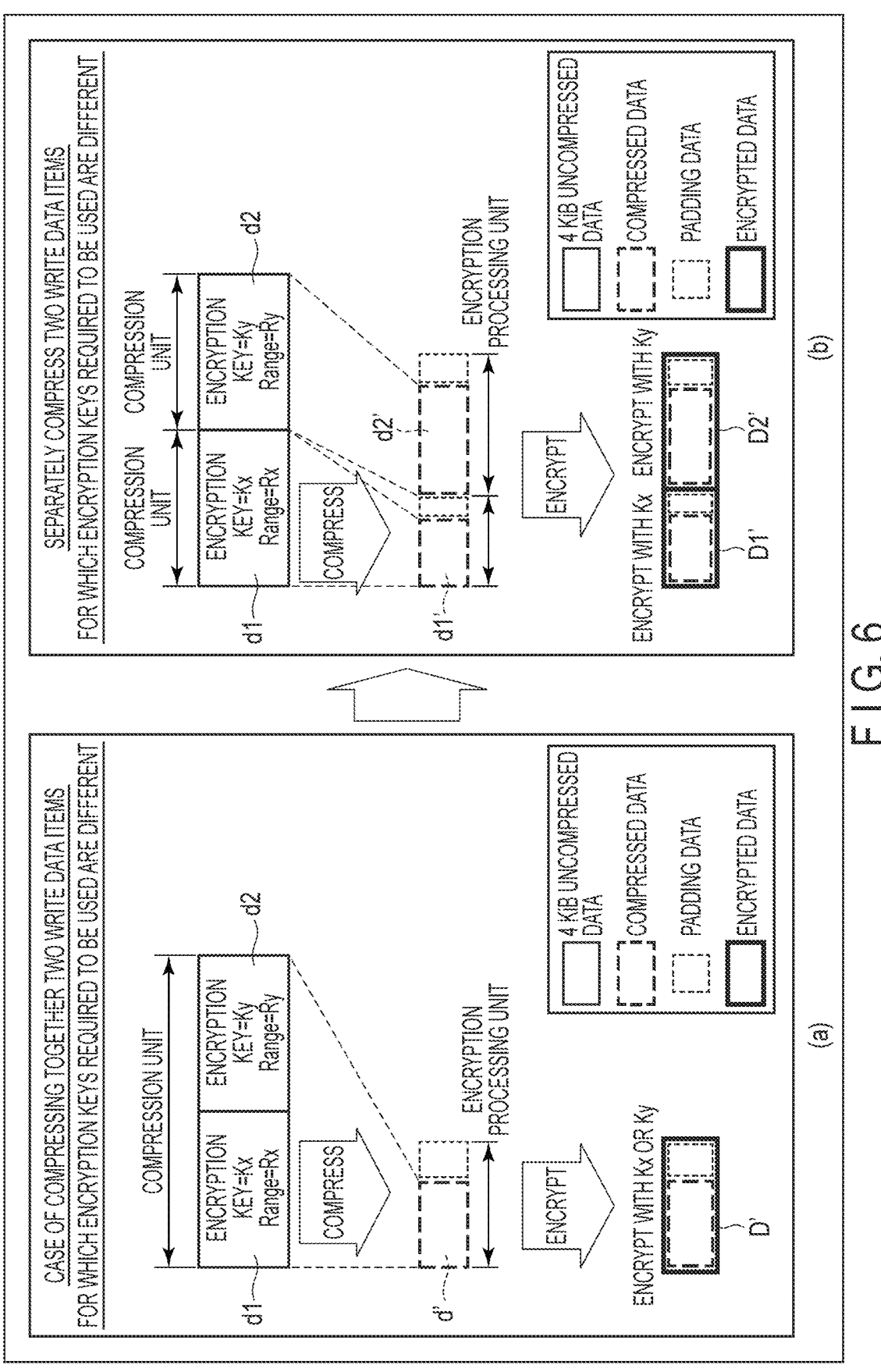
F I G. 6

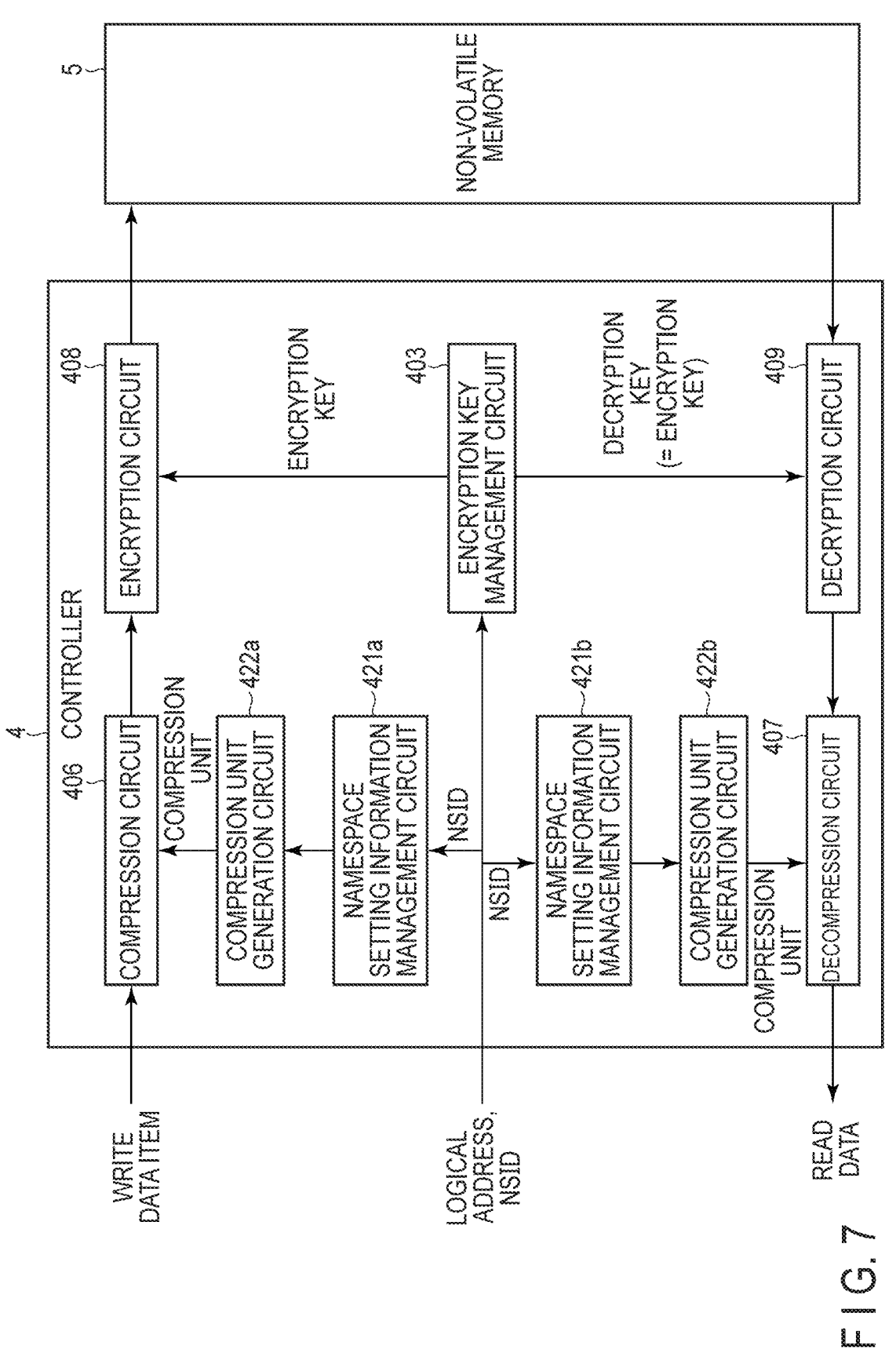
F I G. 7

421a

| NS SETTING INFORMATION MANAGEMENT CIRCUIT |
|---|
| MANAGEMENT TABLE |

461

| ITEM | DESCRIPTION |
|---|---|
| MINIMUM ACCESS GRANULARITY | AlignmentGranularity (COMMON TO EVERY NS) |
| THE NUMBER OF ENCRYPTION KEYS FOR NS1 | 4 |
| THE NUMBER OF ENCRYPTION KEYS FOR NS2 | 1 |
| THE NUMBER OF ENCRYPTION KEYS FOR NS3 | 1 |
| LBA DATA SIZE OF NS1 | 4KiB |
| LBA DATA SIZE OF NS2 | 16KiB |
| LBA DATA SIZE OF NS3 | 4KiB |

F I G. 8

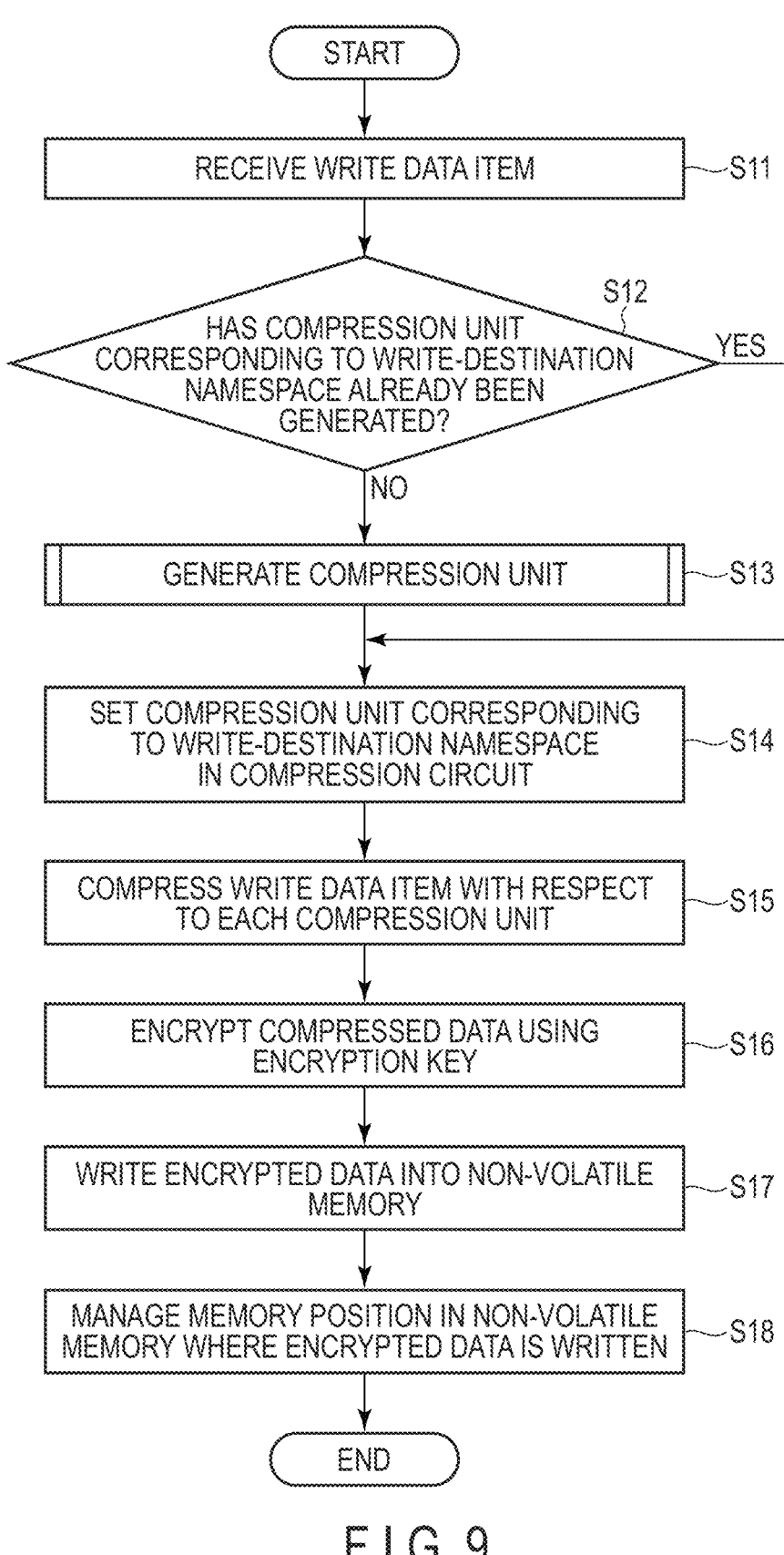
F I G. 9

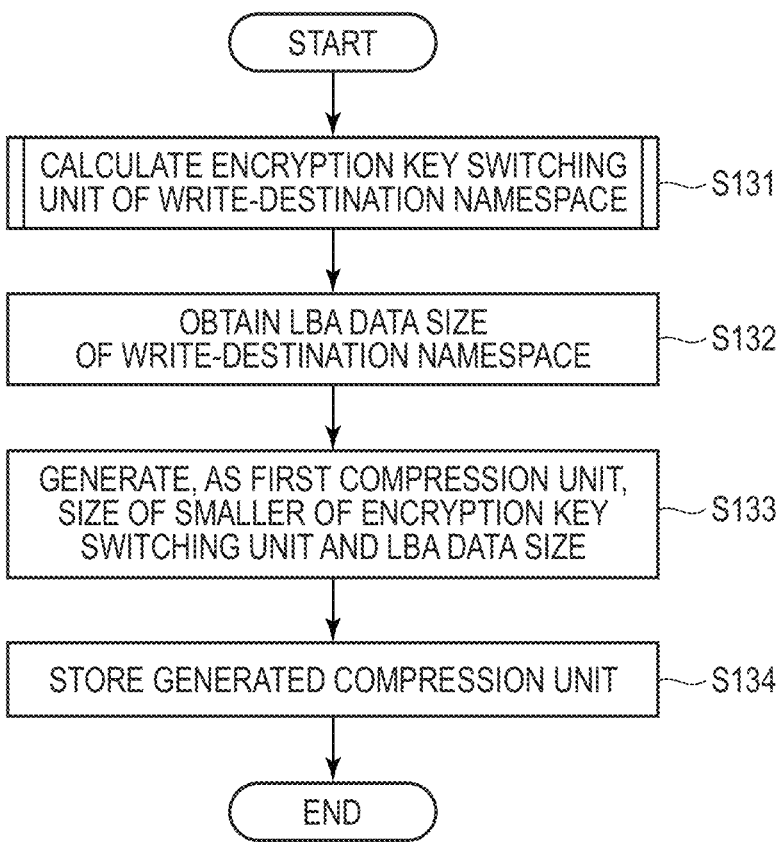
F I G. 10

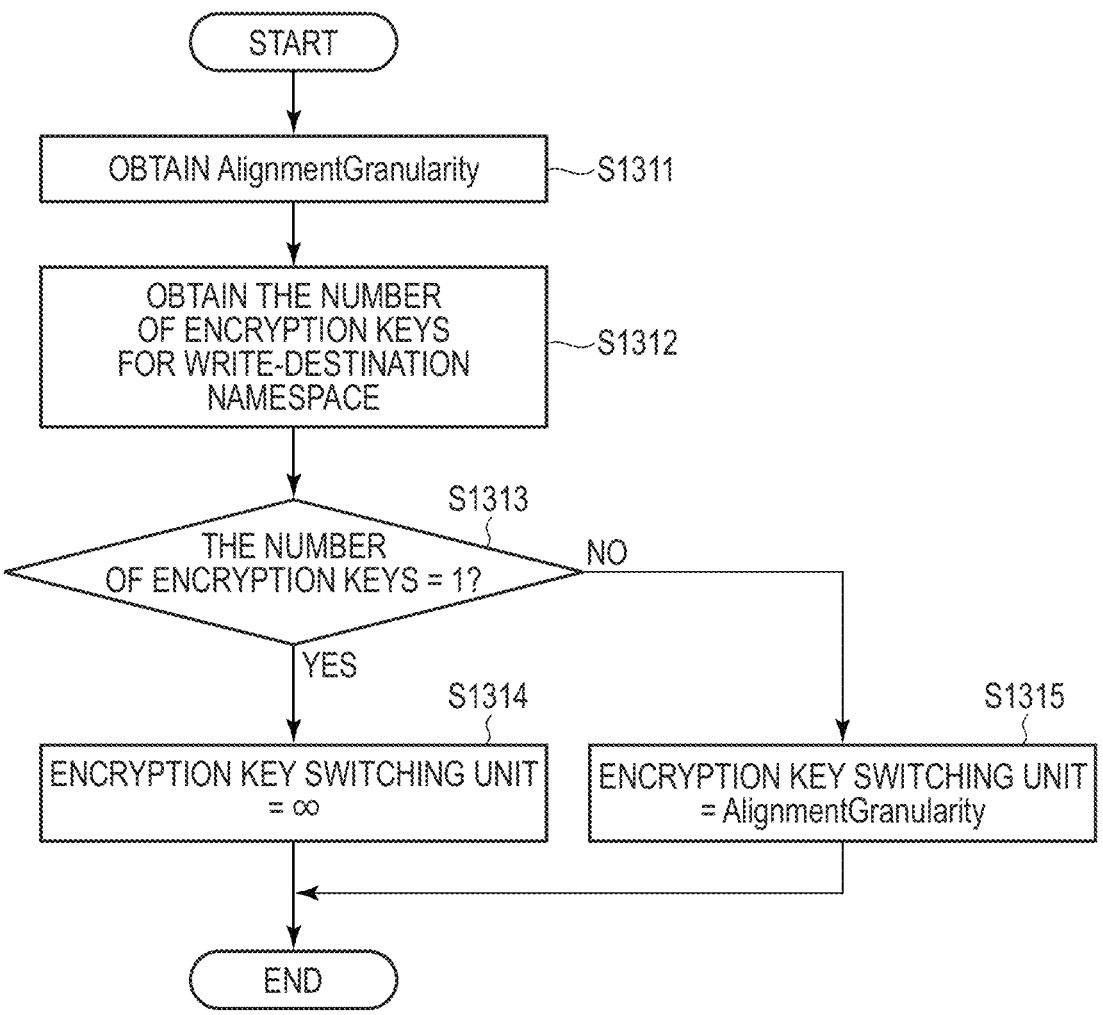
F I G. 11

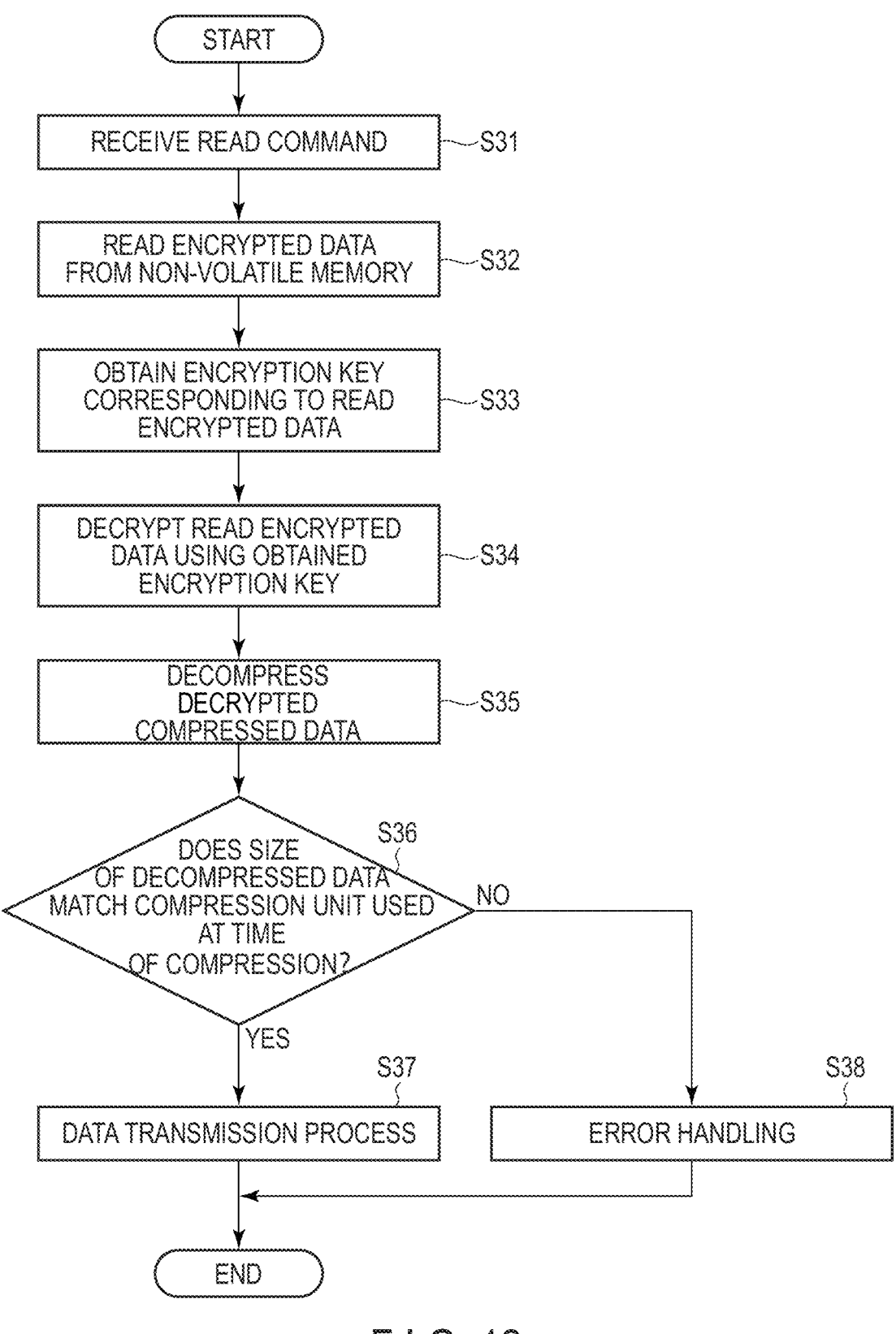
F I G. 12

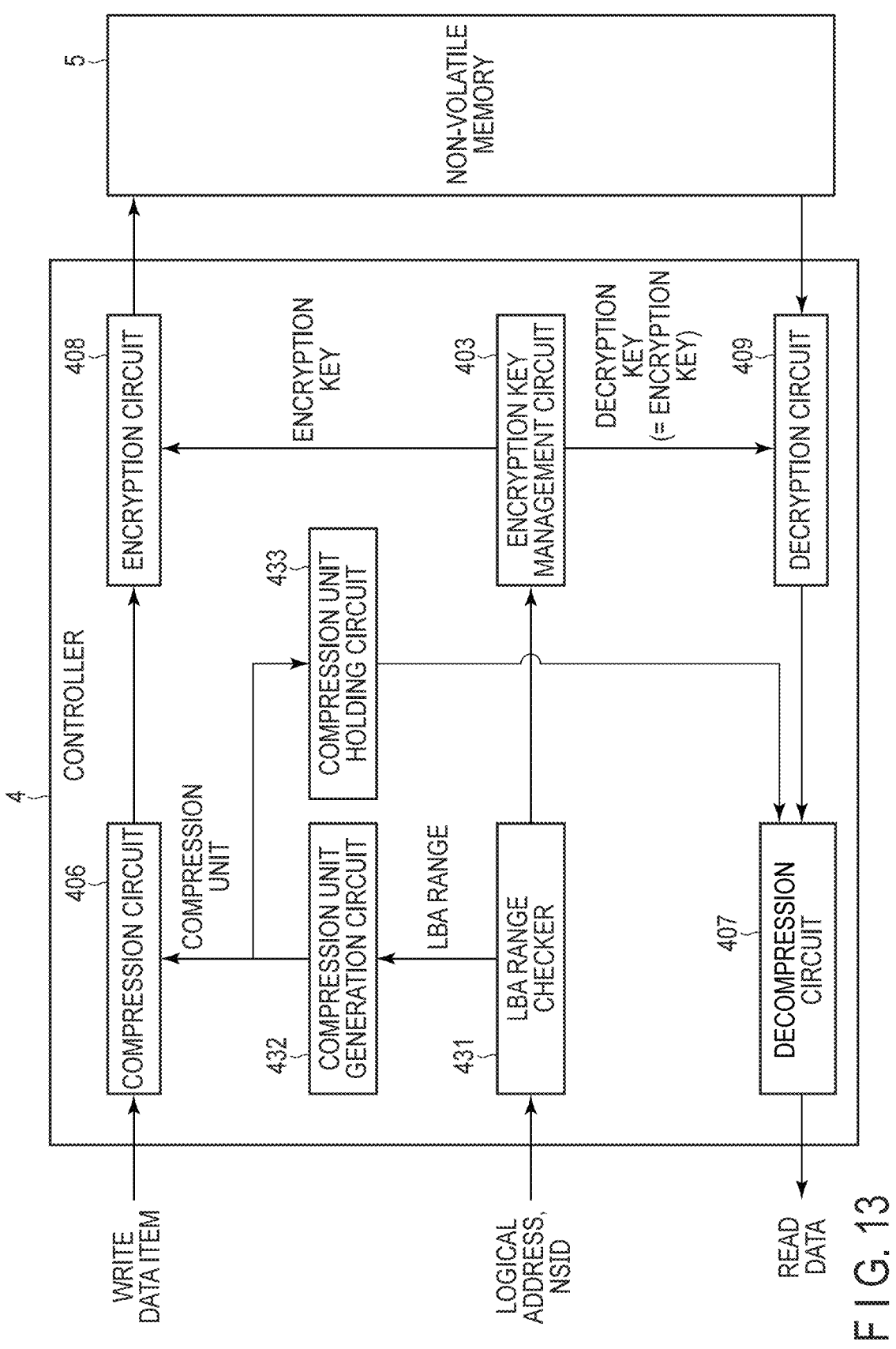
F I G. 13

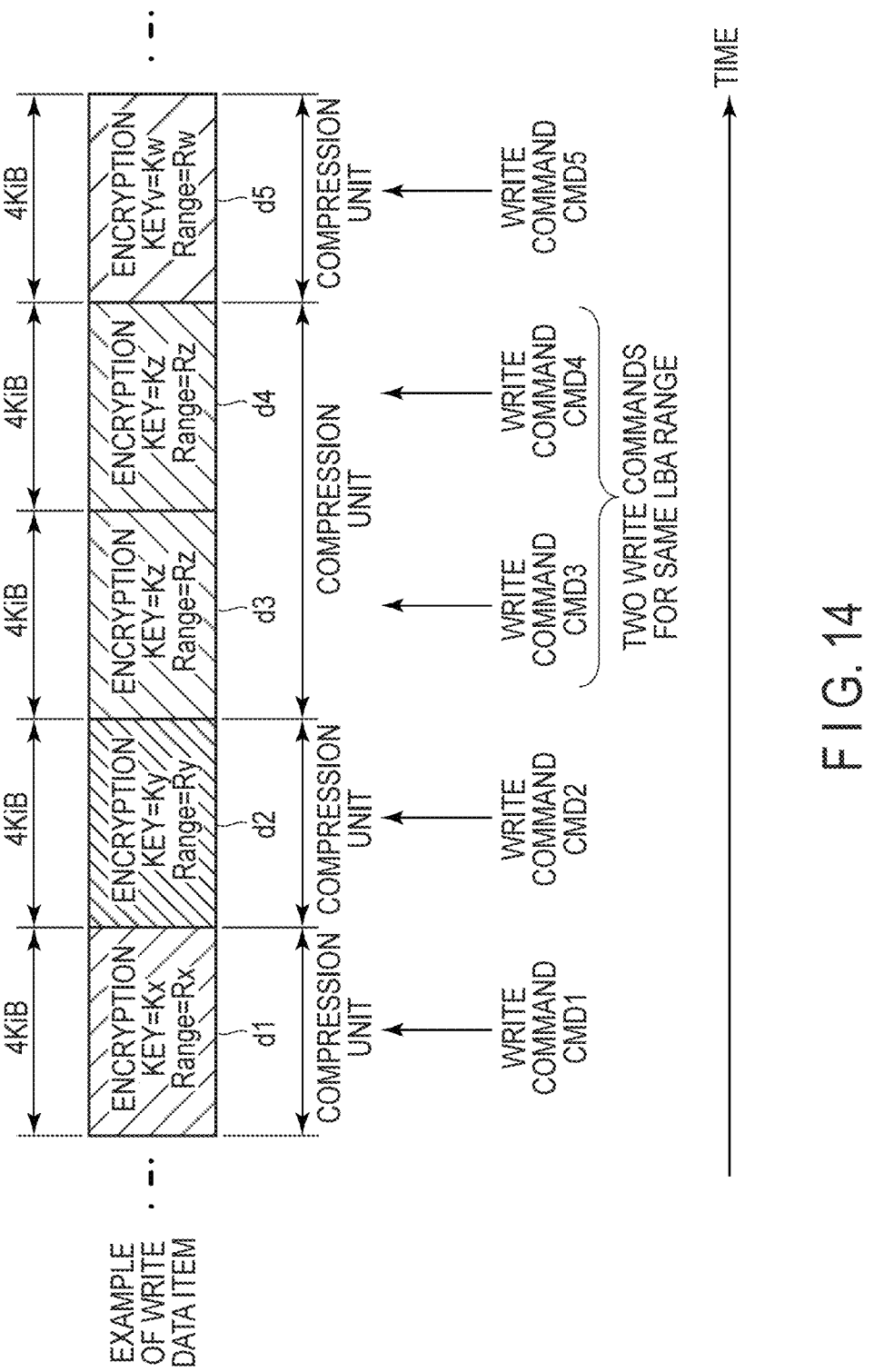
F I G. 14

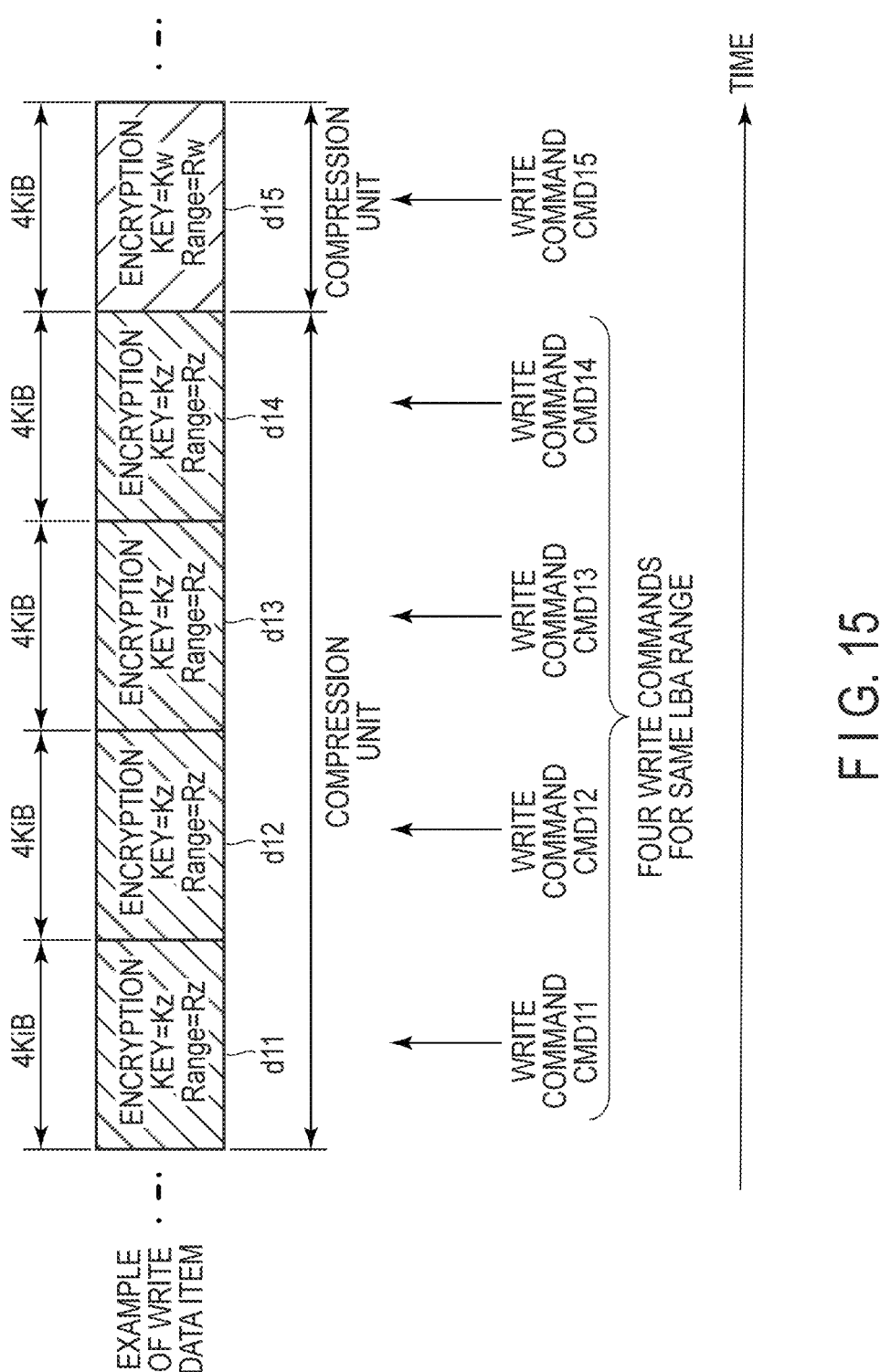
F I G. 15

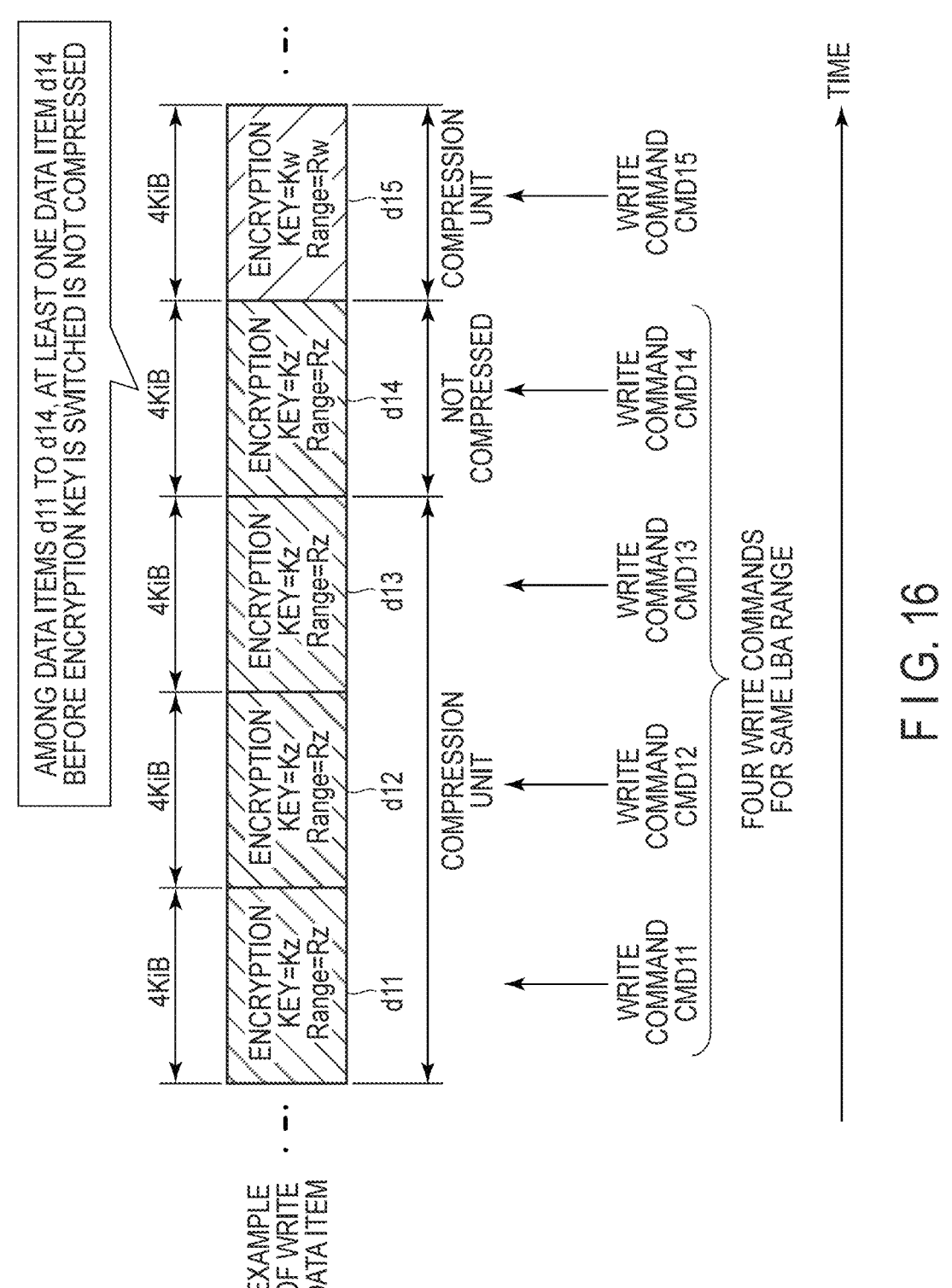
F I G. 16

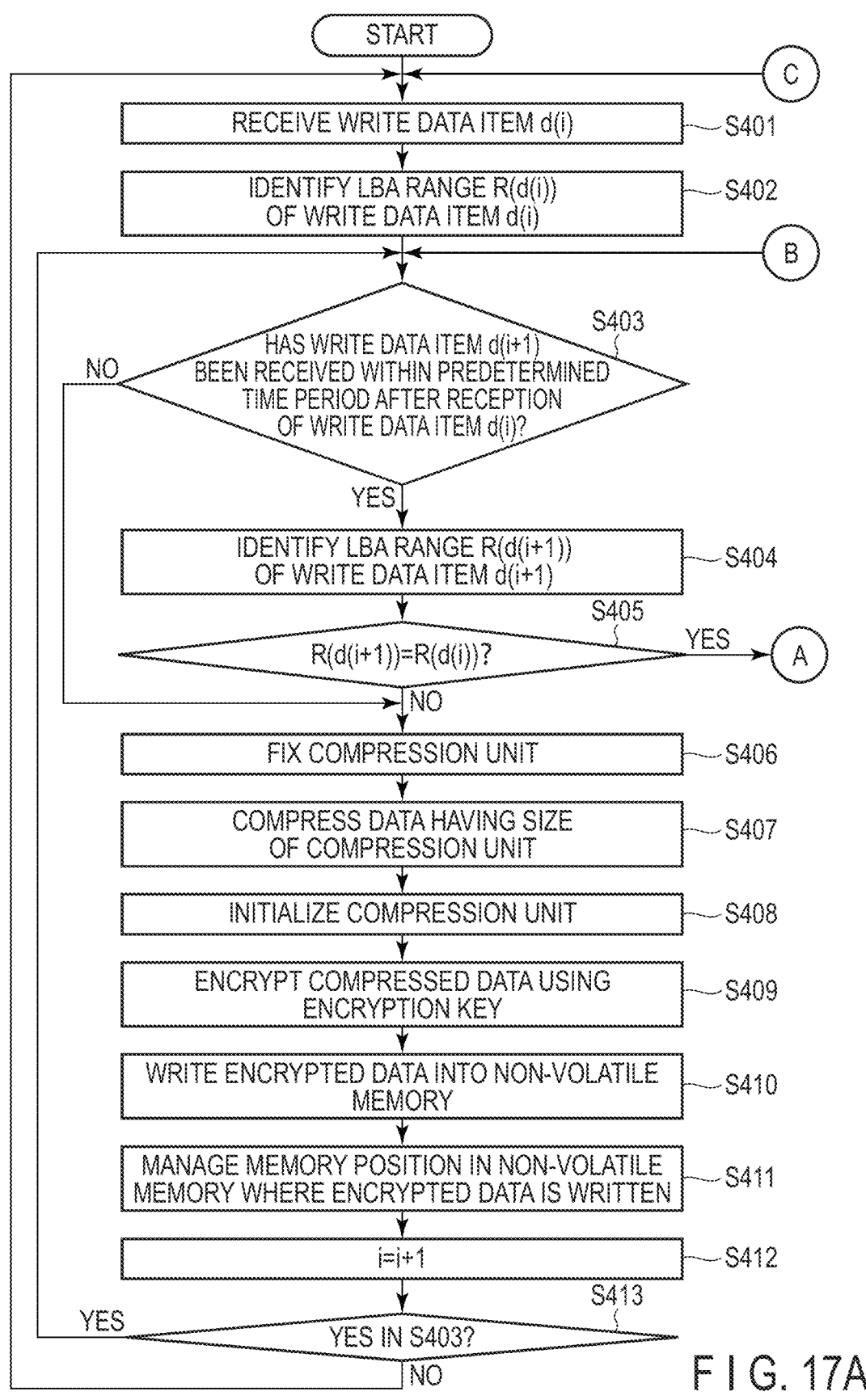
F I G. 17A

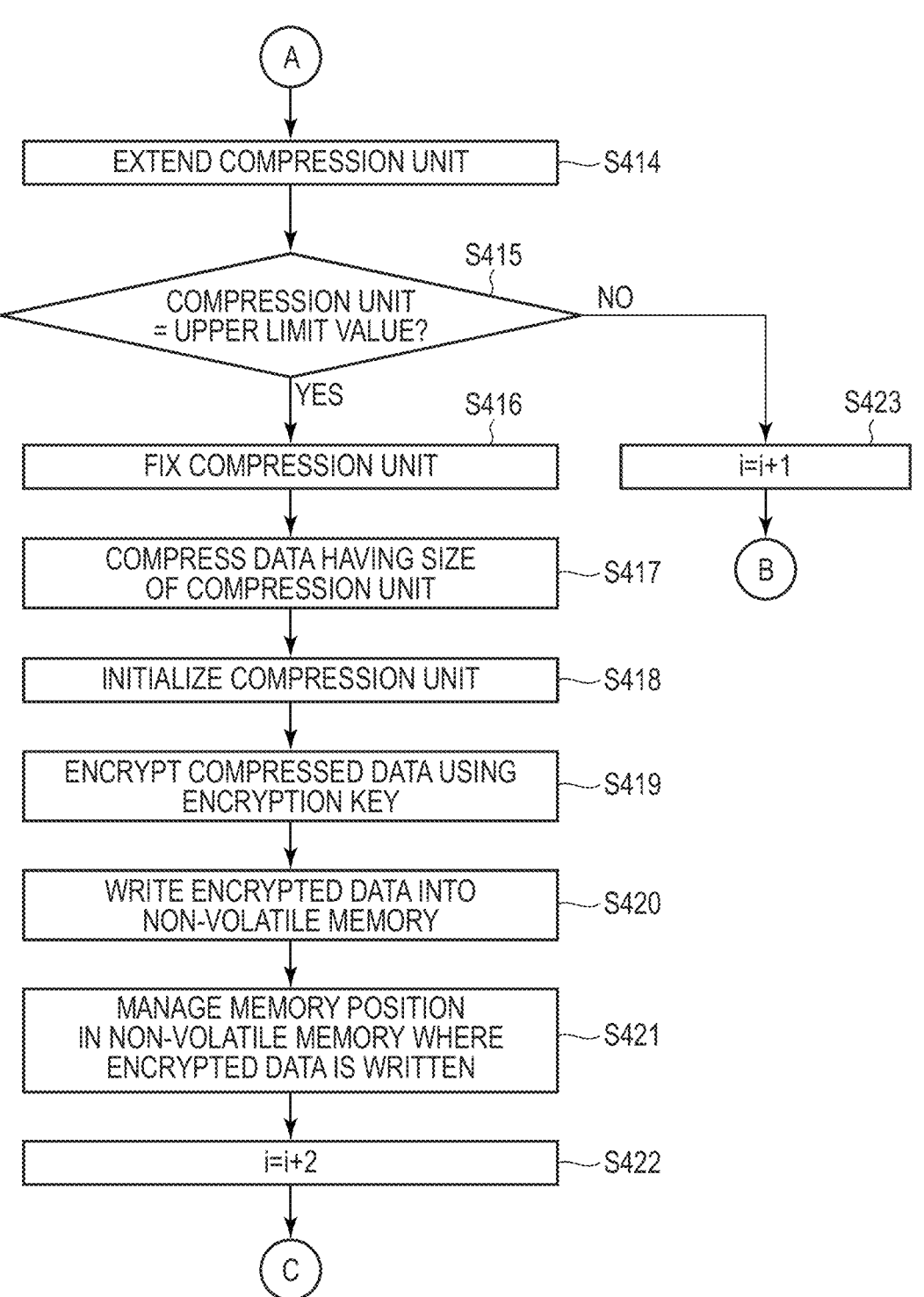
F I G. 17B

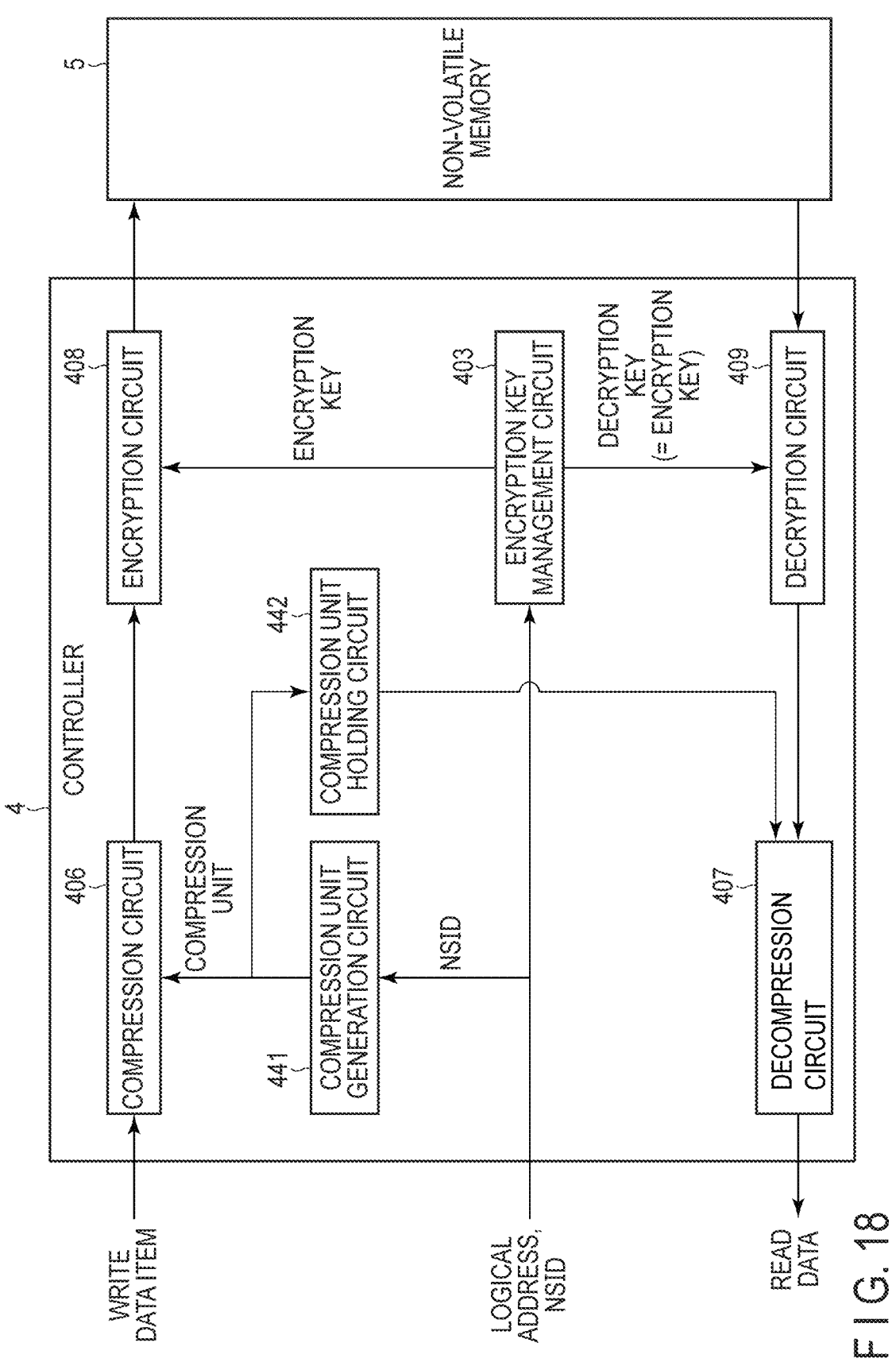
F I G. 18

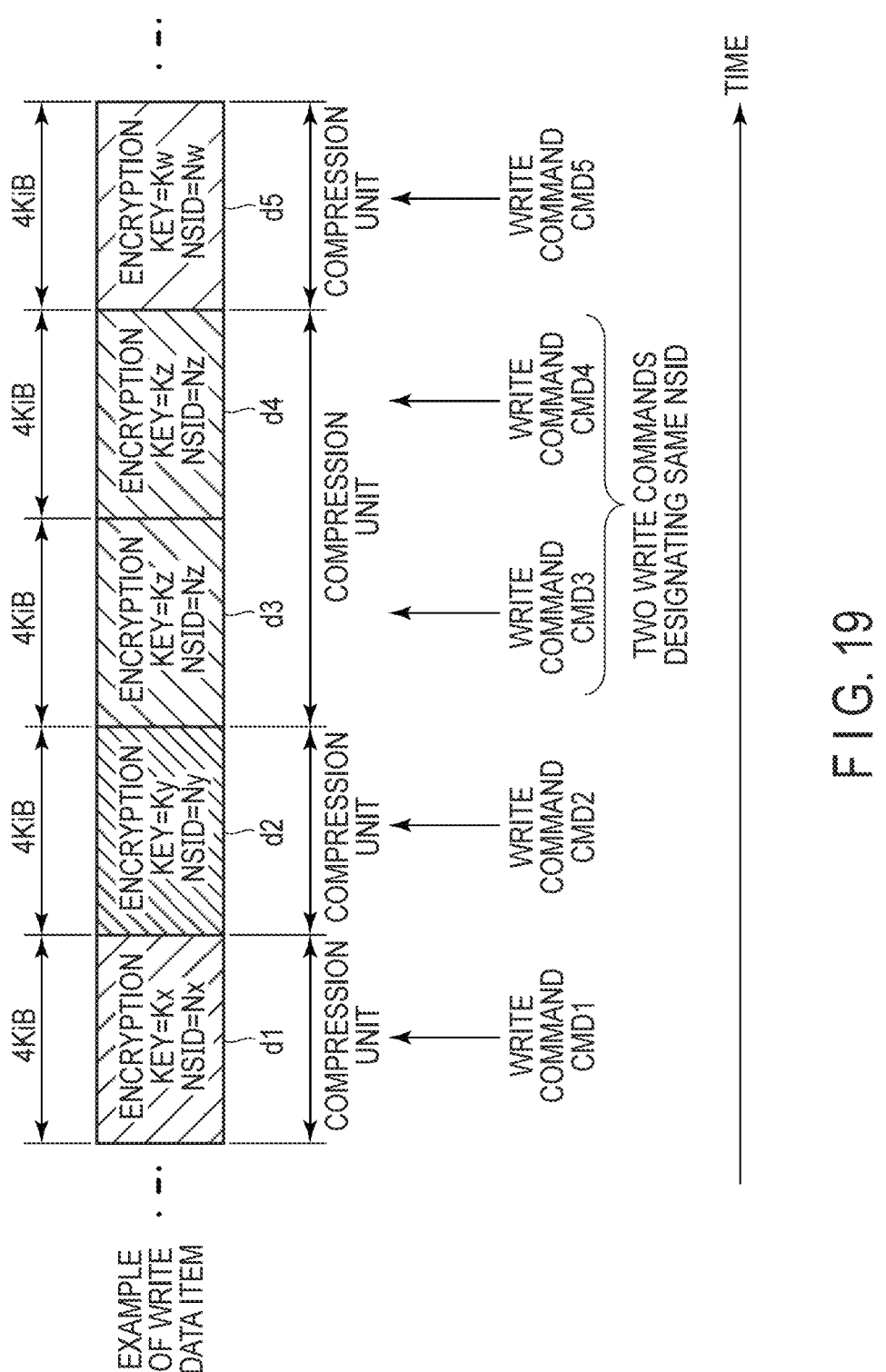
F I G. 19

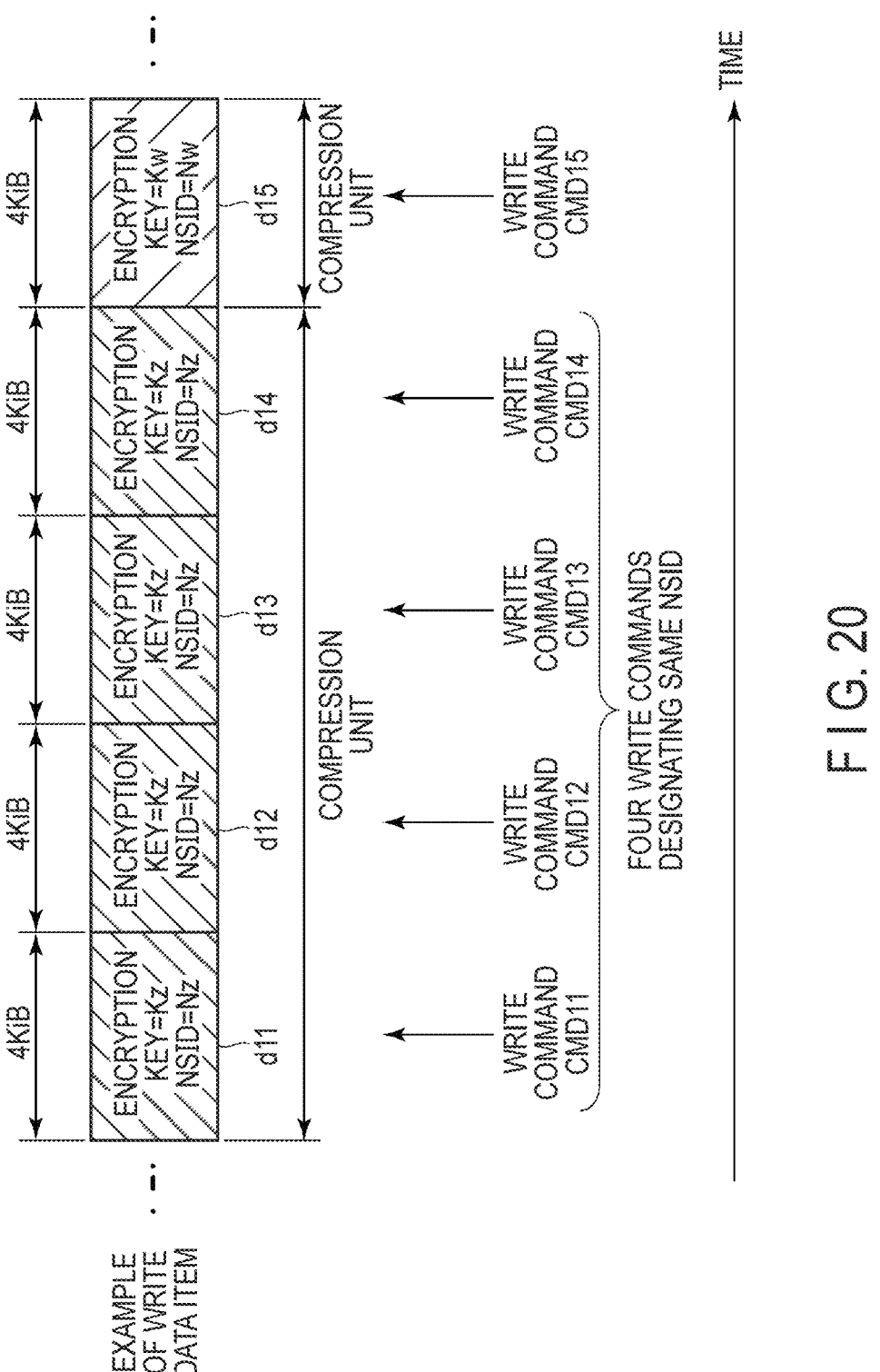
F I G. 20

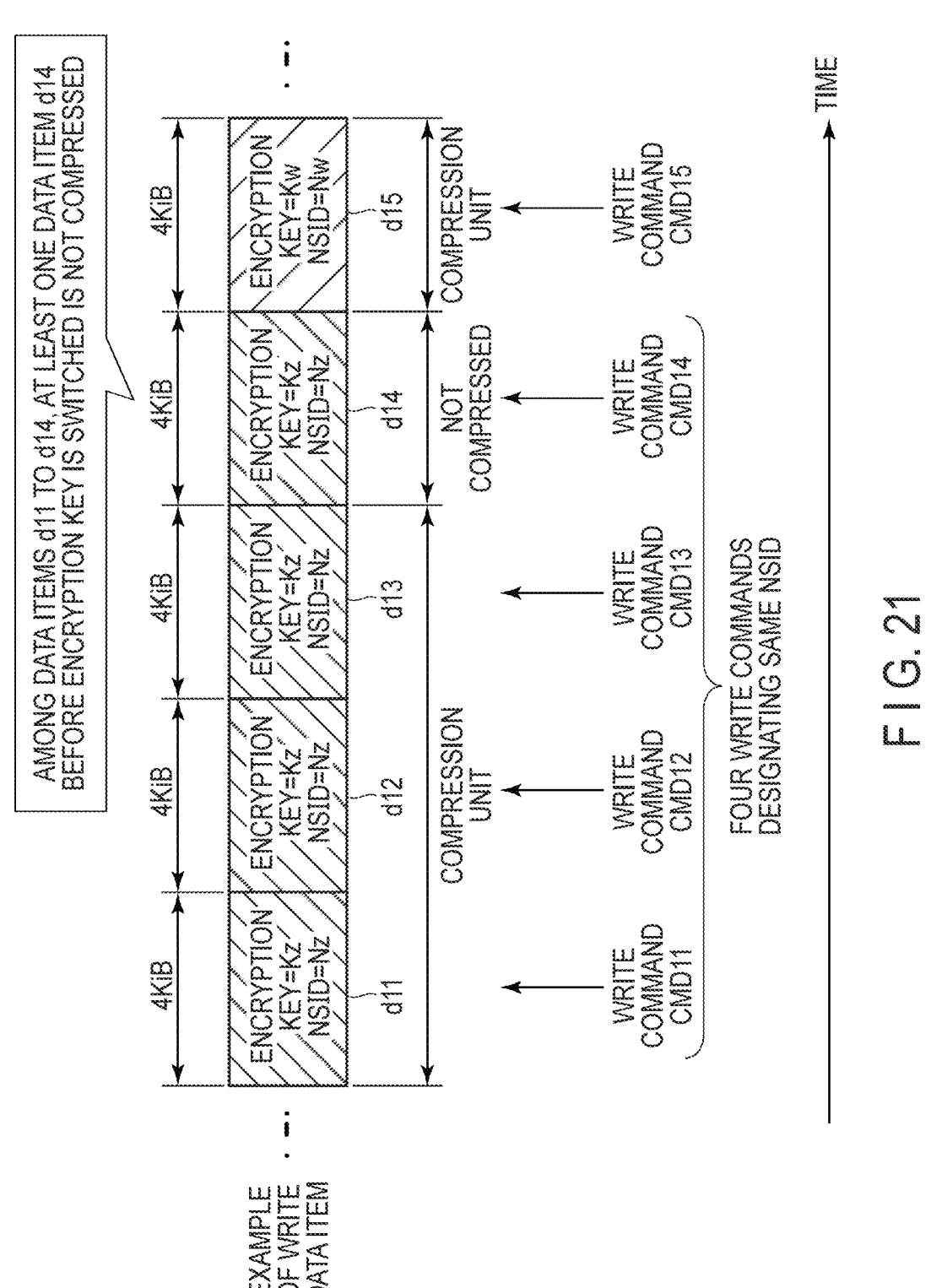
F I G. 21

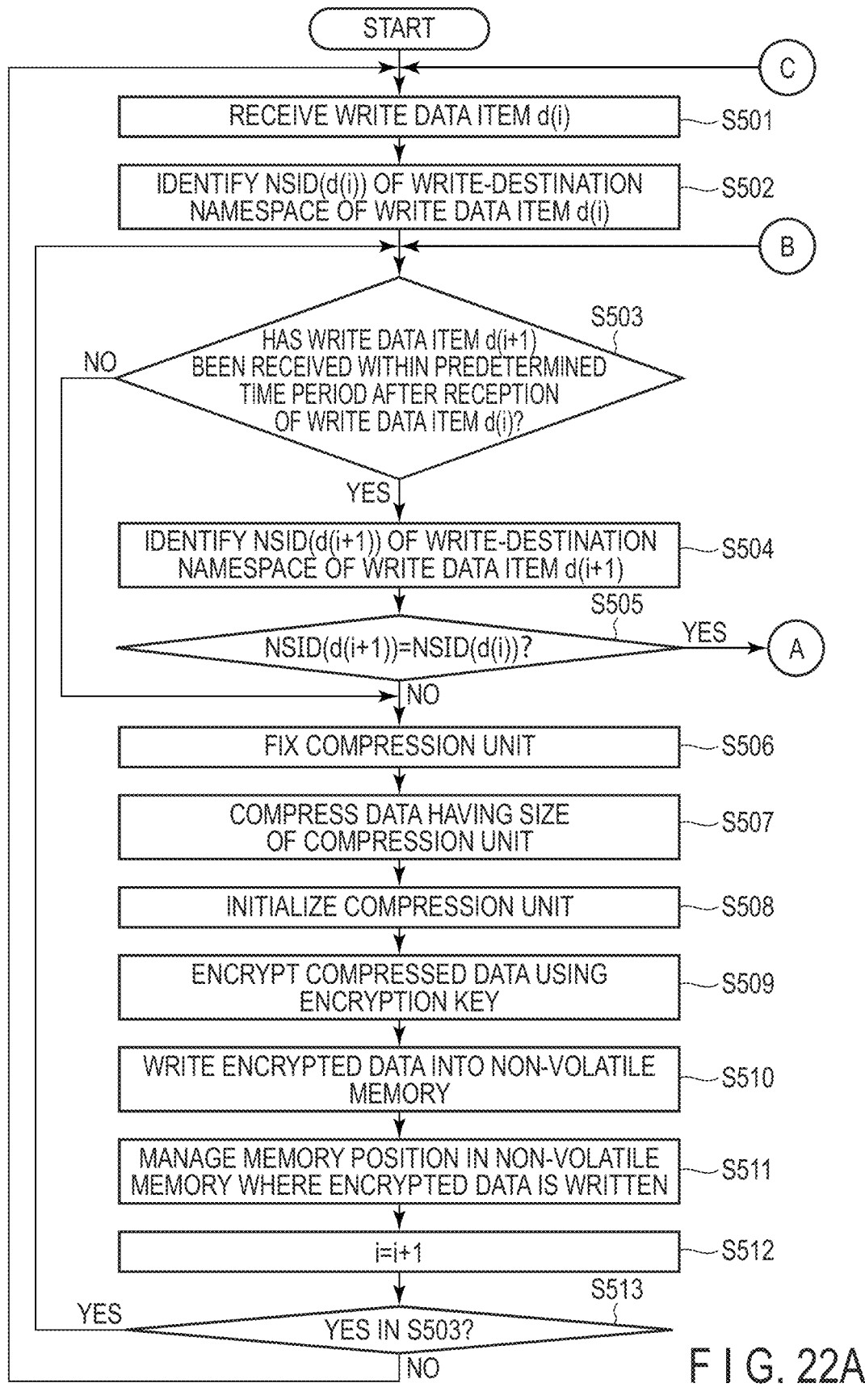
F I G. 22A

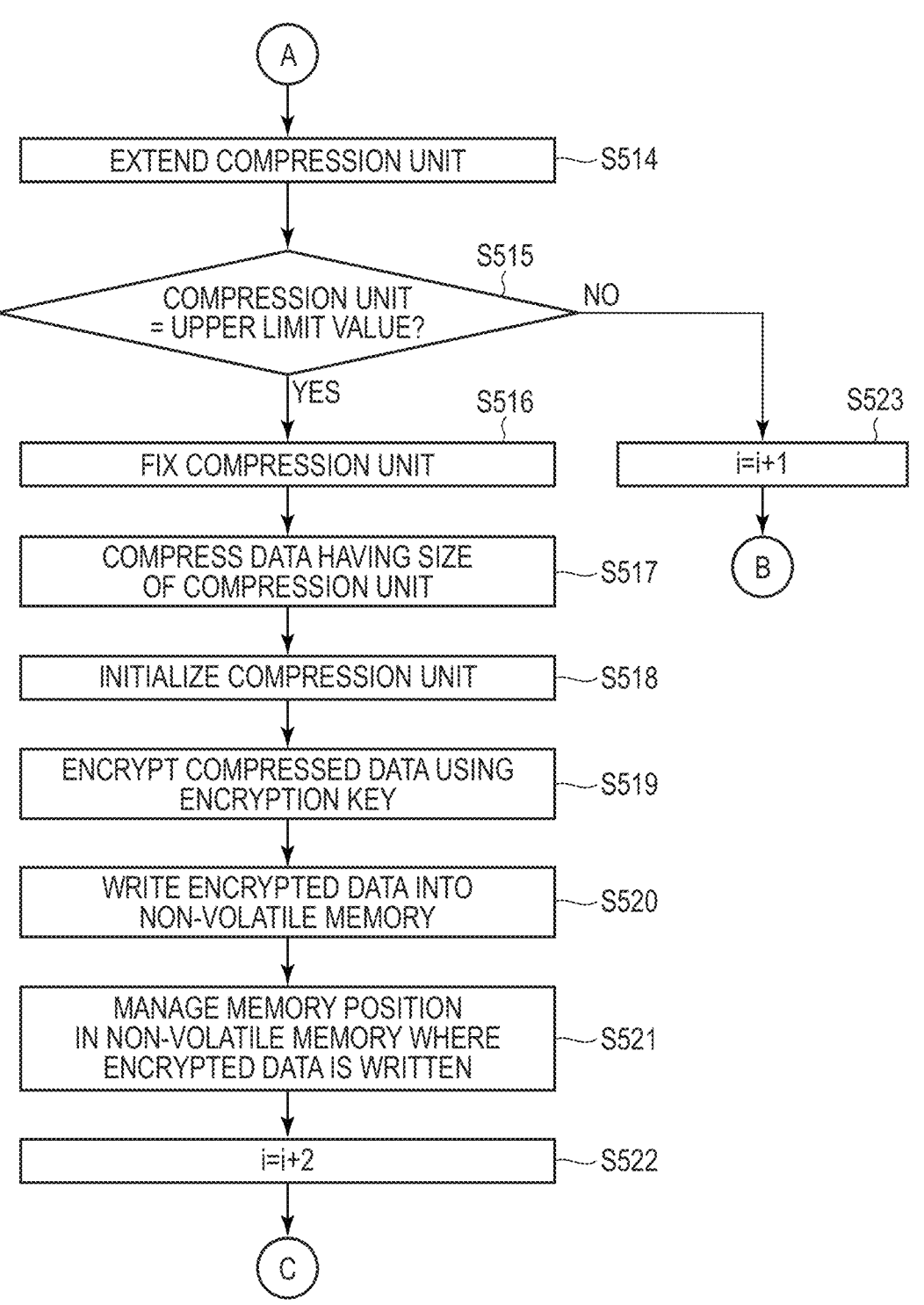
F I G. 22B

MEMORY SYSTEM AND CONTROL METHOD

CROSS-REFERENCE TO RELATED APPLICATION

This application is based upon and claims the benefit of priority from Japanese Patent Application No. 2023-109957, filed Jul. 4, 2023, the entire contents of which are incorporated herein by reference.

FIELD

Embodiments described herein relate generally to a memory system that includes a non-volatile memory, and a control method of controlling the memory system.

BACKGROUND

In recent years, memory systems that include non-volatile memories have widely been in widespread use. As one of such memory systems, a solid state drive (SSD) including an NAND-type flash memory has been known.

In these days, it is demanded to achieve a memory system that is helpful to effective use of a storage space of a non-volatile memory, and is effective in protecting user data stored in the memory system.

An aspect that an embodiment of the present invention intends to achieve is to provide a memory system and a control method that are helpful to effective use of a storage space of a non-volatile memory, and is effective in protecting user data.

BRIEF DESCRIPTION OF THE DRAWINGS

FIG. 1 is a block diagram showing a configuration example of an information processing system that includes a memory system according to a first embodiment.

FIG. 2 is a block diagram showing a configuration example of each of a plurality of memory chips included in a non-volatile memory of the memory system according to the first embodiment.

FIG. 3 shows a configuration example of namespaces used in the memory system according to the first embodiment.

FIG. 4 shows a configuration example of a locking table used in the memory system according to the first embodiment.

FIG. 5 shows an example of setting of a logical address range (LBA range) in the memory system according to the first embodiment.

FIG. 6 shows an example of a relationship between a compression unit for compressing data, and an encryption key for encrypting data.

FIG. 7 shows examples of a data writing process and a data reading process executed in the memory system according to the first embodiment.

FIG. 8 shows an example of namespace setting information managed in the memory system according to the first embodiment.

FIG. 9 is a flowchart showing procedures of the data writing process executed in the memory system according to the first embodiment.

FIG. 10 is a flowchart showing procedures of a compression unit generating process executed in the memory system according to the first embodiment.

FIG. 11 is a flowchart showing procedures of an encryption key switching unit calculating process executed in the memory system according to the first embodiment.

FIG. 12 is a flowchart showing procedures of the data reading process executed in the memory system according to the first embodiment.

FIG. 13 shows examples of a data writing process and a data reading process executed in a memory system according to a second embodiment.

FIG. 14 shows a first example of a compression process for a plurality of write data items executed in the memory system according to the second embodiment.

FIG. 15 shows a second example of the compression process for a plurality of write data items executed in the memory system according to the second embodiment.

FIG. 16 shows a third example of the compression process for a plurality of write data items executed in the memory system according to the second embodiment.

FIG. 17A is a flowchart showing part of procedures of the data writing process executed in the memory system according to the second embodiment.

FIG. 17B is a flowchart showing remaining procedures of the data writing process executed in the memory system according to the second embodiment.

FIG. 18 shows examples of a data writing process and a data reading process executed in a memory system according to a third embodiment.

FIG. 19 shows a first example of a compression process for a plurality of write data items executed in the memory system according to the third embodiment.

FIG. 20 shows a second example of the compression process for a plurality of write data items executed in the memory system according to the third embodiment.

FIG. 21 shows a third example of the compression process for a plurality of write data items executed in the memory system according to the third embodiment.

FIG. 22A is a flowchart showing part of procedures of the data writing process executed in the memory system according to the third embodiment.

FIG. 22B is a flowchart showing remaining procedures of the data writing process executed in the memory system according to the third embodiment.

DETAILED DESCRIPTION

Various embodiments will be described hereinafter with reference to the accompanying drawings.

In general, according to one embodiment, a memory system connectable to a host, includes a non-volatile memory and a controller having circuitry configured to manage a plurality of namespaces, and control the non-volatile memory, the namespaces being used by the host in order to access the memory system. The circuitry compresses a write data item received from the host, encrypts the compressed data, using an encryption key, determines a compression unit that is a unit of compressing the write data item, for each of the namespaces, determines a first compression unit in response to reception of a write command designating a namespace identifier of a write-destination namespace from the host, the first compression unit being calculated based on first namespace setting information indicating setting of the write-destination namespace, corresponding to the write-destination namespace, and having a size satisfying a constraint that an encryption key for encrypting data to be written into the write-destination namespace is not switched in the first compression unit and compresses data specified by the write command according to the first compression unit.

Hereinafter, embodiments are described with reference to the drawings.

First Embodiment

FIG. 1 is a block diagram showing a configuration example of an information processing system 1 that includes a memory system 3 according to a first embodiment. The information processing system 1 includes a host 2, and the memory system 3. The host 2 and the memory system 3 are connectable to each other via a bus 7.

The host 2 is an information processing apparatus. The host 2 is, for example, a personal computer, a server computer, or a mobile terminal. The host 2 accesses the memory system 3. Specifically, the host 2 transmits (or more generally, as used herein, conveys), to the memory system 3, a write command that is a command for writing data. Furthermore, the host 2 transmits, to the memory system 3, a read command that is a command for reading data.

The memory system 3 is a storage device connectable to the host 2. The memory system 3 is achieved by a solid state drive (SSD). The memory system 3 includes a non-volatile memory. The memory system 3 writes data into the non-volatile memory. Furthermore, the memory system 3 reads data from the non-volatile memory.

Communication between the memory system 3 and the host 2 is executed via the bus 7. The bus 7 is a transmission path that connects the host 2 and the memory system 3 to each other. The bus 7 is, for example, a PCI Express™ (PCIe™) bus. The host 2 and the memory system 3 transmit and receive data, input/output (I/O) commands, and their responses, via the PCIe bus. The I/O command is a command for writing data into the non-volatile memory, or reading data from the non-volatile memory. The I/O command is, for example, a write command or a read command.

For example, the NVM Express™ (NVMe™) standard can be used as a logical interface standard for connecting the host 2 and the memory system 3 to each other. According to the interface of the NVMe standard, transmission and reception of a command and its response are executed between the host 2 and the memory system 3 using a pair of queues that includes at least one submission queue (SQ) and a completion queue (CQ) associated with this submission queue (SQ). The pair of queues is called a submission queue/completion queue pair (SQ/CQ pair). The host 2 issues a command by storing the command in the submission queue (SQ), and processes a completion response stored in the completion queue (CQ), thus verifying whether the process for the issued command has been completed or not. The memory system 3 fetches the command stored in the submission queue (SQ) to thus receive the command from the host 2, and stores the completion response corresponding to the command having been processed, in the completion queue (CQ) to thus notify the host 2 that the process for the command has been completed.

Next, the configuration of the host 2 is described.

The host 2 includes a processor 21, and a memory 22. The processor 21 and the memory 22 are connected to each other via an internal bus 20.

The processor 21 is, for example, a CPU. The processor 21 executes software (host software) loaded from the memory system 3, or another storage device connected to the host 2, into the memory 22. The host software includes, for example, an operating system, a file system, and an application program.

The memory 22 is, for example, a volatile memory. The memory 22 is also called a main memory, a system memory, or a host memory. The memory 22 is, for example, a dynamic random access memory (DRAM). Part of the memory area of the memory 22 is used to store the SQ/CQ pair. Another part of the memory area of the memory 22 is used as a data buffer. The data buffer stores write data to be written into the memory system 3, or read data transferred from the memory system 3.

Next, an internal configuration of the memory system 3 is described. The memory system 3 includes a controller 4, and a non-volatile memory 5. The memory system 3 may further include a random access memory, e.g., a dynamic random access memory (DRAM) 6.

The controller 4 is a memory controller. The controller 4 is, for example, a control circuit, such as a system-on-a-chip (SoC). The controller 4 is electrically connected to the non-volatile memory 5. The controller 4 processes I/O commands received from the host 2, thereby respectively executing a data reading process for reading data from the non-volatile memory 5, and a data writing process for writing data into the non-volatile memory 5. For example, the Toggle NAND Flash Interface, or the Open NAND Flash Interface (ONFI) is used as a physical interface that connects the controller 4 and the non-volatile memory 5 to each other. A function of each component of the controller 4 can be achieved by dedicated hardware, a processor for executing a program, or a combination of them.

An example of the non-volatile memory 5 is, for example, an NAND-type flash memory. The non-volatile memory 5 may be a flash memory having a two-dimensional structure, or a flash memory having a three-dimensional structure. The non-volatile memory 5 includes, for example, a plurality of memory chips. The memory chips are also called memory dice. The memory chips are respectively achieved as NAND-type flash memory dice. Hereinafter, the memory chip is called the NAND chip. FIG. 1 shows a case where the non-volatile memory 5 includes 32 NAND chips #0 to #31.

A DRAM 6 is a volatile memory. Part of the memory area of the DRAM 6 is used to store management data used by the controller 4, for example.

Next, an internal configuration of the controller 4 is described. The controller 4 includes a host interface (host I/F) 401, a CPU 402, an encryption key management circuit 403, an error-correcting code (ECC) processing circuit 404, a DRAM interface (DRAM I/F) 405, a compression circuit 406, a decompression circuit 407, an encryption circuit 408, a decryption circuit 409, a buffer memory 410, and a non-volatile memory interface (non-volatile memory I/F) 411. These host interface 401, CPU 402, encryption key management circuit 403, ECC processing circuit 404, DRAM interface 405, compression circuit 406, decompression circuit 407, encryption circuit 408, decryption circuit 409, buffer memory 410, and non-volatile memory interface 411 are connected to each other via an internal bus 400.

The host interface 401 is a communication interface circuit that executes communication with the host 2. The host interface 401 receives (fetches) various commands, such as a write command and a read command, from the host 2. The host interface 401 then transmits, to the host 2, a response (e.g., completion response) corresponding to a command processed by the controller 4.

The write command is a command that requests the memory system 3 to write user data (write data item) into the non-volatile memory 5. The write command designates, for example, a namespace identifier for identifying a write-destination namespace, a write-destination logical address (start LBA) in the write-destination namespace, the size of write data item (number of LBAs) associated with the write command, and a data pointer indicating the position in the memory 22 in which the write data item is stored. The write-destination namespace is a namespace in which the write data item is to be written. The write-destination logical address is an initial logical address where the write data item is to be written.

The read command is a command that requests the memory system 3 to read user data (read-target data) from the non-volatile memory 5. The read command designates, for example, a namespace identifier for identifying the namespace, a logical address (start LBA) in the namespace, the size of the read-target data (number of LBAs), and a data pointer indicating the position in the memory 22 where the read-target data is to be transferred.

The CPU 402 is a processor. The CPU 402 performs various processes by executing control programs (firmware) stored in the non-volatile memory 5 or a ROM, not shown.

The CPU 402 serves as, for example, a flash translation layer (FTL), and performs management of data stored in the non-volatile memory 5, and management of blocks included in the non-volatile memory 5. The management of data stored in the non-volatile memory 5 includes, for example, management of mapping information. The CPU 402 manages the mapping information using a logical/physical address conversion table (L2P table). The mapping information is information indicating mapping between the logical addresses, and the respective physical addresses of the non-volatile memory 5. The logical address is an address used by the host 2 to access the memory system 3. For example, a logical block address (LBA) is used as the logical address. The LBA is a logical address used to refer to data called a logical block. The size of the logical block that can be designated by the LBA is, for example, 512 bytes, 4 KiB, 8 KiB, 16 KiB or the like. The physical address is an address indicating the physical memory position in the non-volatile memory 5.

The CPU 402 creates and manages a plurality of namespaces. Each of the namespaces is a set of logical addresses. The plurality of namespaces are used to make a single memory system operate as if it were a plurality of memory systems. Each of the namespaces is used by the host 2 to access the memory system 3. The namespaces are identified respectively by namespace identifiers. The namespace identifier is an identifier used by the host 2 to designate a namespace to be accessed.

The management of the blocks included in the non-volatile memory 5 encompasses management of bad blocks included in the non-volatile memory 5, wear levelling, and garbage collection.

The encryption key management circuit 403 is a circuit that manages encryption keys. The encryption key is a key used to encrypt and decrypt a write data item. The encryption key management circuit 403 manages one or more encryption keys, for each namespace, for example. The details of the encryption key management circuit 403 are described later with reference to FIG. 4.

The ECC processing circuit 404 executes an error correction coding process when data is written into the non-volatile memory 5. The error correction coding process is a process of adding an error-correcting code (ECC), as a redundancy code, to data to be written into the non-volatile memory 5. When data is read from the non-volatile memory

5, the ECC processing circuit 404 executes an error correction decoding process. The error correction decoding process is a process of using the ECC added to the data read from the non-volatile memory 5, and detecting and correcting an error of the data.

The DRAM interface 405 is a circuit that controls DRAM 6. The DRAM interface 405 stores data in the DRAM 6. The DRAM interface 405 reads the data stored in the DRAM 6.

The compression circuit 406 is a circuit that compresses the write data item associated with the write command received from the host 2. The compression circuit 406 compresses the write data item using a lossless compression algorithm. Hereinafter, data obtained by compressing the write data item is called compressed data. Examples of the lossless compression algorithm include, for instance, dictionary encoding, entropy encoding, a combination of dictionary encoding and entropy encoding, etc.

The compressed data has a smaller size than the write data item having not been compressed yet does. The larger the size of the write data item compressed at one time by the compression circuit 406 is, the smaller the ratio of the size of the compressed data to the size of the write data item is. That is, the larger the size of the write data item compressed at one time is, the higher the efficiency at which the compression circuit 406 can compress the write data item is. This is because the amount of information that can be referred to in the compression process for the write data item increases as the size of the write data item compressed at one time increases.

The size of the write data item compressed at one time by the compression circuit 406 is called a compression unit. That is, the compression unit is a unit of compressing the write data item.

The decompression circuit 407 is a circuit that generates uncompressed data by decompressing the compressed data.

The encryption circuit 408 is a circuit that encrypts the compressed data. Hereinafter, data encrypted by the encryption circuit 408 is called encrypted data. The encryption circuit 408 encrypts compressed data output from the compression circuit 406, using an encryption key managed by the encryption key management circuit 403, thereby generating encrypted data to be written into the non-volatile memory 5. The generated encrypted data is subjected to the error correction coding process executed by the ECC processing circuit 404, and is subsequently written into the non-volatile memory 5 via the non-volatile memory interface 411.

The decryption circuit 409 is a circuit that decrypts the encrypted data. The decryption circuit 409 decrypts the encrypted data read from the non-volatile memory 5, using the encryption key managed by the encryption key management circuit 403. The encrypted data read from the non-volatile memory 5 is data obtained by encrypting compressed data. The encrypted data read from the non-volatile memory 5 is error-corrected by the ECC processing circuit 404, and is subsequently transferred from the ECC processing circuit 404 to the decryption circuit 409. The decryption circuit 409 generates decrypted compressed data by decrypting the encrypted data, and transfers the generated compressed data to the decompression circuit 407.

The buffer memory 410 is a volatile memory that temporarily holds data. Part of the memory area of the buffer memory 410 is used to temporarily store the write data item received from the host 2. Another part of the memory area of the buffer memory 410 is used to temporarily store data read from the non-volatile memory 5.

The non-volatile memory interface 411 is a circuit that controls the non-volatile memory 5. The non-volatile memory interface 411 is electrically connected to the plurality of NAND chips included in the non-volatile memory 5.

Each NAND chip can independently operate. Accordingly, the NAND chip functions as a unit allowing operation in parallel. The non-volatile memory interface 411 is connected to channels ch0, ch1, . . . , and ch7. The non-volatile memory interface 411 is connected to one or more NAND chips via the channels ch0, ch1, . . . , and ch7. FIG. 1 exemplifies a case where four NAND chips are connected to each of the channels ch0, ch1, . . . , and ch7. In this case, the non-volatile memory interface 411 is connected to the NAND chips #0, #8, #16, and #24, via the channel ch0. The non-volatile memory interface 411 is connected to the NAND chips #1, #9, #17, and #25, via the channel ch1. The non-volatile memory interface 411 is then connected to the NAND chips #7, #15, #23, and #31, via the channel ch7. The NAND chips #0, #1, . . . , and #7 are dealt with as a bank BNK0 by the controller 4. Likewise, the NAND chips #8, #9, . . . , and #15 are dealt with as a bank BNK1 by the controller 4. The NAND chips #16, #17, . . . , and #23 are dealt with as a bank BNK2 by the controller 4. The NAND chips #24, #25, . . . , and #31 are dealt with as a bank BNK3 by the controller 4. The bank is a unit of operating the NAND chips in parallel through interleaving operation.

In the configuration of the non-volatile memory 5 shown in FIG. 1, the controller 4 can write data in parallel in the NAND chips the number of which is 32 at the maximum (the number of parallel writes=32), through the eight channels and the interleaving operation among four banks. Note that each of the NAND chips #0 to #31 may have a multi-plane configuration that has a plurality of planes. For example, in a case where each of the NAND chips #0 to #31 includes two planes, the controller 4 can write data in parallel into the planes the number of which is 64 at the maximum (the number of parallel writes=64).

Next, a configuration of the NAND chip is described. FIG. 2 is a block diagram showing a configuration example of each of the NAND chips included in the non-volatile memory 5.

The NAND chip #n is any NAND chip (n is an integer from 0 to 31) among the NAND chips #0 to #31. The NAND chip #n includes a memory cell array 51. The memory cell array 51 includes a plurality of blocks BLK0 to BLKq−1. Each of the blocks BLK0 to BLKq−1 includes a plurality of pages (here, pages P0 to Pp−1). Each page includes a plurality of memory cells. Each of the blocks BLK0 to BLKq−1 is a unit of data erasing operation that erases data. Each of the pages P0 to Pp−1 is unit of data writing operation and data reading operation.

FIG. 3 is a diagram for illustrating a plurality of namespaces managed by the memory system 3.

FIG. 3 shows a case where the controller 4 manages namespaces NS1, NS2, and NS3. Each namespace is identified by a namespace identifier (NSID). Each namespace includes a set of consecutive logical addresses (LBAs). A logical address space corresponding to each namespace starts at LBA0. Each namespace can be configured to have any size. The size of a certain namespace is represented by a value obtained by multiplying the number of LBAs included in the namespace by the data size per LBA included in the namespace. The data size per LBA is set separately for each namespace.

In FIG. 3, the namespace NS1 is a namespace identified by a namespace identifier NSID1. The namespace NS1 includes a plurality of LBAs consecutive from LBA0 to LBA(x−1).

The namespace NS2 is a namespace identified by a namespace identifier NSID2. The namespace NS2 includes a plurality of LBAs consecutive from LBA0 to LBA(y−1).

The namespace NS3 is a namespace identified by a namespace identifier NSID3. The namespace NS3 includes a plurality of LBAs consecutive from LBA0 to LBA(z−1).

Next, management of encryption keys is described. FIG. 4 shows a configuration example of a locking table used in the memory system 3 according to the first embodiment.

The encryption key management circuit 403 manages one or more encryption keys for each namespace (i.e., each NSID) using a locking table 403-1. The locking table 403-1 is a table that holds locking information. The locking information is information indicating the corresponding relationship among the NSID of each of the namespaces, one or more logical address ranges (LBA ranges (Range)) set for each of the namespaces, and the one or more encryption keys associated respectively with the one or more LBA ranges of each namespace.

In FIG. 4, four LBA ranges (ranges Rx, Ry, Rz, and Rw) are set for the namespace NS1, one LBA range (range Rs) is set for the namespace NS2, and one LBA range (range Rt) is set for the namespace NS3.

The range Rx is a logical address range that has logical addresses consecutive from LBA0 to LBAh−1 in the namespace NS1. The encryption key associated with the range Rx is, for example, an encryption key Kx. In this case, data corresponding to any logical address belonging to the range Rx is encrypted or decrypted using the encryption key Kx.

The range Ry is an LBA range that has logical addresses consecutive from LBAh to LBAi−1 in the namespace NS1. The encryption key associated with the range Ry is, for example, an encryption key Ky. In this case, data corresponding to any logical address belonging to the range Ry is encrypted or decrypted using the encryption key Ky.

The range Rz is an LBA range that has logical addresses consecutive from LBAi to LBAj−1 in the namespace NS1. The encryption key associated with the range Rz is, for example, an encryption key Kz. In this case, data corresponding to any logical address belonging to the range Rz is encrypted or decrypted using the encryption key Kz.

The range Rw is an LBA range that has logical addresses consecutive from LBAj to LBAx−1 in the namespace NS1. The encryption key associated with the range Rw is, for example, an encryption key Kw. In this case, data corresponding to any logical address belonging to the range Rw is encrypted or decrypted using the encryption key Kw.

The range Rs is an LBA range that has logical addresses consecutive from LBA0 to LBAy−1 in the namespace NS2. That is, every logical address included in the namespace NS2 is included in the range Rs. The encryption key associated with the range Rs is, for example, an encryption key Ks. In this case, data corresponding to any logical address included in the range Rs is encrypted or decrypted using the encryption key Ks. Thus, data to be written into the namespace NS2 is encrypted or decrypted using the encryption key Ks.

The range Rt is an LBA range that has logical addresses consecutive from LBA0 to LBAz−1 in the namespace NS3. That is, every logical address included in the namespace NS3 is included in the range Rt. The encryption key associated with the range Rt is, for example, an encryption key Kt. In this case, data corresponding to any logical address belonging to the range Rt is encrypted or decrypted using the encryption key Kt. Thus, data to be written into the namespace NS3 is encrypted or decrypted using the encryption key Kt.

Next, an example of range setting conforming to the TCG Opal standard is described. FIG. 5 shows an example of range setting in the memory system 3 according to the first embodiment.

According to the TCG Opal standard, a namespace locking object that is called a namespace global range locking object is associated with the namespace. The namespace global range locking object is an initial namespace locking object associated with the namespace. The namespace locking object is used to perform access control for the namespace, and management of the encryption key associated with the namespace. Hereinafter, the namespace global range locking object is simply called a namespace global range, or a global range (Global range).

For example, in an initial state immediately after creation of the namespace NS1, the entire namespace NS1 is in a state where the global range (Global range) is associated therewith. An administrator assigns the LBA ranges, such as the ranges Ry, Rz, and Rw, to the global range of the namespace NS1 which allows, for example, different users to encrypt data respectively with different encryption keys, and store the encrypted data in the namespace NS1. Here, the administrator designates each LBA range by designating the start LBA of the corresponding LBA range, and the size of (number of LBAs in) the corresponding LBA range. Each of the ranges Ry, Rz, and Rw is associated with a namespace non-global range locking object. The namespace non-global range locking object is used to perform access control for the corresponding LBA range, and management of the encryption key associated with the corresponding LBA range. Hereinafter, it is simply called a namespace non-global range, or a non-global range (Non-global range).

Note that the LBA ranges, such as the range Ry, Rz, and Rw, are overlaid on the global range. Accordingly, the three areas in the global range where the range Ry, Rz, and Rw are overlaid are hidden by the range Ry, Rz, and Rw.

Next, compression of the write data item, and encryption of compressed data are described. FIGS. 6A and 6B show an example of the relationship between a compression unit for compressing data, and an encryption key for encrypting data.

Here, compression and encryption are executed for a write data item d1 of 4 KiB, and a write data item d2 of 4 KiB. An LBA corresponding to d1 of 4 KiB belongs to the range Rx. Accordingly, an encryption key to be used to encrypt the write data item d1 of 4 KiB is the encryption key Kx. On the other hand, an LBA corresponding to the write data item d2 of 4 KiB belongs to the range Ry. Accordingly, an encryption key to be used to encrypt the write data item d2 of 4 KiB is the encryption key Ky.

First, referring to FIG. 6, part (a), a case of compressing the write data items d1 and d2 together is described. To compress the write data item d1 of 4 KiB and the write data item d2 of 4 KiB at one time, the size of the compression unit in the compression circuit is set to 8 KiB. The larger the size of the compression unit is set, the higher the efficiency at which data can be compressed is. Accordingly, the compression circuit can compress data at higher efficiency by compressing the data with a compression unit of 8 KiB, in comparison with a case of compression with the compression unit of 4 KiB.

The compressed data d' generated by the compression circuit is data in which the write data items d1 and d2 are mixed. The encryption circuit encrypts the compressed data d'. Here, if the size of the compressed data d' is less than the encryption unit, the encryption circuit encrypts data that includes this compressed data d' and padding data added thereto, thus generating encrypted data D'.

However, an encryption key to be used to encrypt the write data item d1 is the encryption key Kx, and an encryption key to be used to encrypt the write data item d2 is the encryption key Ky. That is, two types of write data items (d1 and d2) included in the compressed data d' are data items to be encrypted respectively using the encryption keys different from each other. For example, in a case of encrypting the compressed data d' using the encryption key Kx, the encryption circuit uses the encryption key Kx and encrypts data that includes the write data item d2 required to be encrypted with the encryption key Ky. On the other hand, in a case of encrypting the compressed data d' using the encryption key Ky, the encryption circuit uses the encryption key Ky and encrypts data that includes the write data item d1 required to be encrypted with the encryption key Kx.

Accordingly, if two write data items for which encryption keys required to be used for encryption are different from each other are compressed together, one of the write data items is encrypted using an encryption key different from the encryption key required to be used. Such a situation is undesirable in view of security.

Next, referring to FIG. 6, part (b), a case of separately compressing the write data items d1 and d2 is described. To separately compress the write data items d1 and d2, the size of the compression unit in the compression circuit is set to 4 KiB. First, the compression circuit compresses the write data item d1 of 4 KiB, and generates compressed data d1'. The compression circuit then compresses the write data item d2 of 4 KiB, and generates compressed data d2'. As described above, the compression circuit compresses the data with the compression unit of 4 KiB. This circuit thus compresses the data with a compression unit smaller than that in the compression in FIG. 6, part (a). Accordingly, the efficiency of data compression tends to be lower than that in the case in FIG. 6, part (a).

This compression generates the compressed data d1' corresponding to the write data item d1, and the compressed data d2' corresponding to the write data item d2.

The encryption circuit then executes encryption for the compressed data d1', and encryption for the compressed data d2'. If the size of the compressed data d1' is less than the encryption unit, the encryption circuit executes encryption for data that includes this compressed data d1' and padding data added thereto. If the size of the compressed data d2' is less than the encryption unit, the encryption circuit executes encryption for data that includes this compressed data d2' and padding data added thereto.

The encryption circuit encrypts data that includes the compressed data d1', using the encryption key Kx, thus generating encrypted data D1'. The encryption circuit encrypts data that includes the compressed data d2', using the encryption key Ky, thus generating encrypted data D2'.

Accordingly, if two write data items for which encryption keys required to be used for encryption are different from each other are separately compressed, data encrypted using an encryption key different from the encryption key required to be used can be prevented from occurring.

As described above, for a storage device that performs both compression and encryption for user data (a write data item associated with the write command from the host 2), a constraint "data items for which encryption keys required to be used for encryption are different are separated in compression units different from each other" occurs.

For example, in a case where the encryption key is not changed at a granularity smaller than 4 KiB, the constraint can be satisfied by fixing the compression unit to 4 KiB.

However, with certain setting of the write-destination namespace or the like, the constraint "data items for which encryption keys required to be used for encryption are different are separated in compression units different from each other" can be satisfied even if the compression unit is set to a size larger than 4 KiB.

According to the present embodiment, any one of the following three configurations is applicable.

First configuration: a first configuration is a configuration that generates a compression unit that is based on namespace setting information indicating setting of the write-destination namespace, and is preferable for the write-destination namespace.

Second configuration: a second configuration is a configuration that can extend the compression unit, in a case where one encryption key is managed for each logical address range (LBA range), and a first logical address range (first LBA range) to which the logical address designated by the latest write command belongs matches a second logical address range (second LBA range) to which the logical address designated by the penultimate write command belongs.

Third configuration: a third configuration is a configuration that can extend the compression unit, in a case where the number of encryption keys used for each namespace is one, and the first namespace identifier designated by the latest write command matches the second namespace identifier designated by the penultimate write command.

The memory system to which any of these configurations is applied can increase the compression unit while satisfying the constraint "data items for which encryption keys are different are separated in compression units different from each other". Consequently, a higher compression efficiency can be achieved than that in a case of using the configuration of fixing the compression unit to 4 KiB.

Hereinafter, a case of applying the first configuration to the memory system 3 according to the first embodiment is described.

First, the data writing process and the data reading process are described. FIG. 7 shows examples of the data writing process and the data reading process executed in the memory system 3 according to the first embodiment.

Here, the controller 4 includes, in addition to the configuration described with reference to FIG. 1, a namespace setting information management circuit 421 and a compression unit generation circuit 422.

The namespace setting information management circuit 421 is a circuit that manages the namespace setting information corresponding to each of the namespaces managed by the memory system 3. The namespace setting information corresponding to a certain namespace includes, for example, information indicating the number of encryption keys used in the corresponding namespace, and information indicating the data size per logical address included in the logical address space of the corresponding namespace. The data size per logical address is also called an LBA data size. The namespace setting information may include information indicating the number of LBA ranges included in the corresponding namespace, instead of the number of encryption keys in the corresponding namespace. The namespace setting information management circuit 421 manages the minimum access granularity. The minimum access granularity is AlignmentGranularity defined in the TCG Opal SSC standard. The encryption key required to be used for encryption is not switched in AlignmentGranularity. In other words, the size of the LBA range (the number of LBAs) is set to a size of AlignmentGranularity or more. AlignmentGranularity is a setting value common to the namespaces managed by the controller 4. That is, AlignmentGranularity for the namespaces is set to the same value.

As shown in FIG. 7, the namespace setting information management circuit 421 may include a namespace setting information management circuit 421a used for the data writing process, and a namespace setting information management circuit 421b used for the data reading process. When a write command designating the namespace identifier (NSID) of the write-destination namespace is received, the namespace setting information management circuit 421a selects the namespace setting information (the number of encryption keys, AlignmentGranularity, and LBA data size) indicating setting of the write-destination namespace, and outputs the selected namespace setting information. When a read command designating the NSID of a read-target namespace is received, the namespace setting information management circuit 421b selects the namespace setting information (the number of encryption keys, AlignmentGranularity, and LBA data size) indicating setting of the read-target namespace, and outputs the selected namespace setting information.

The compression unit generation circuit 422 is a circuit that generates the compression unit used by the compression circuit 406. As described above, the compression unit is a unit for compressing data. Specifically, the compression unit indicates the size of the write data item compressed at one time by the compression circuit 406.

The compression unit generation circuit 422 generates the compression unit for each of the namespaces. The compression unit generation circuit 422 may include a compression unit generation circuit 422a used in the data writing process, and a compression unit generation circuit 422b used in the data reading process.

When the write command designating the NSID of the write-destination namespace is received, the compression unit generation circuit 422a generates a compression unit (also called a first compression unit) corresponding to the write-destination namespace. The first compression unit is calculated based on the namespace setting information (also called first namespace setting information) on the write-destination namespace output from the namespace setting information management circuit 421a. The first compression unit is a compression unit that has a size satisfying a constraint that an encryption key for encrypting data to be written into the write-destination namespace is not switched in the first compression unit. The compression unit generation circuit 422a then sets the generated first compression unit in the compression circuit 406.

As described above, based on the first namespace setting information, the first compression unit that has a size satisfying the constraint that the encryption key is not switched in the first compression unit is generated. Thus, the compression unit preferable for setting the write-destination namespace can be generated.

The first compression unit is calculated by, for example, the following procedures.

First, the compression unit generation circuit 422a calculates an encryption key switching unit, based on the first namespace setting information. The encryption key switching unit is a unit for switching the encryption key in the write-destination namespace.

Next, the compression unit generation circuit 422a obtains the LBA data size of the write-destination namespace from the first namespace setting information, and calculates, as the first compression unit, a size of the smaller of the calculated encryption key switching unit and the obtained LBA data size.

Specifically, the compression unit generation circuit 422a calculates the compression unit of the write-destination namespace NS by the following Expressions (1) and (2), based on the first namespace setting information.

$$\text{Encryption key switching unit}=(\text{one key in NS})?\infty:\text{AlignmentGranularity} \qquad \text{Expression (1)}$$

$$\text{Compression unit}=\min\{\text{encryption key switching unit of NS, LBA data size of NS}\} \qquad \text{Expression (2)}$$

As shown in Expression (1), if a condition that the number of encryption keys in NS is one is satisfied, infinity ($\infty$) is calculated as an encryption key switching unit. For example, if only a namespace global range is set in NS, the number of encryption keys used in NS is one. Accordingly, the condition that the number of encryption keys in NS is one is satisfied. In a case where sequential write for the entire write-destination namespace NS is executed, the infinity corresponds to the size of the write-destination namespace NS.

As shown in Expression (1), if the condition that the number of encryption keys in NS is one is not satisfied, AlignmentGranularity is calculated as an encryption key switching unit. For example, if a plurality of LBA ranges are set in NS, the number of encryption keys used in NS is more than one. Accordingly, the condition that the number of encryption keys in NS is one is not satisfied.

If the number of encryption keys in NS is one as described above, the compression unit can be large as desired in principle. However, if the compression unit is too large, the time period (decompression latency) required to decompress the compressed data is long, which reduces the performance of random read. Accordingly, using Expression (2), the maximum of the compression unit is defined up to the LBA data size.

Here, an example of calculating the compression unit is described.

For example, it is assumed that two namespaces (NS1 and NS2) are managed by the controller 4, and the following setting is configured.

(1) (Common to namespaces): AlignmentGranularity=4 KiB
(2) NS1: the number of encryption keys used in NS1 is more than one; LBA data size=4 KiB
(3) NS2: the number of encryption keys used in NS2 is one; LBA data size=16 KiB Here, in a case of fixing the compression unit to 4 KiB, the compression unit is 4 KiB in each of the namespaces NS1 and NS2.

According to the present embodiment, Compression unit of NS1=min{encryption key switching unit of NS1, LBA data size of NS1}=min{4 KiB, 4 KiB}=4 KiB. Accordingly, the compression unit for the namespace NS1 is 4 KiB.

On the other hand, compression unit of NS2=min{encryption key switching unit of NS2, LBA data size of NS2}=min{$\infty$, 16 KiB}=16 KiB. Accordingly, the compression unit for the namespace NS2 is 16 KiB.

As described above, according to the present embodiment, a larger compression unit can be set for the namespace NS2 in comparison with the case of fixing the compression unit to 4 KiB. Consequently, a higher compression efficiency can be achieved than that in the case of fixing the compression unit to 4 KiB.

Next, for example, it is assumed that two namespaces (NS1 and NS2) are managed by the controller 4, and the following setting is configured.

(1) (Common to namespaces): AlignmentGranularity=8 KiB
(2) NS1: the number of encryption keys used in NS1 is more than one; LBA data size=4 KiB
(3) NS2: the number of encryption keys used in NS2 in more than one; LBA data size=16 KiB Here, in a case of fixing the compression unit to 4 KiB, the compression unit is 4 KiB in each of the namespaces NS1 and NS2.

According to the present embodiment,

Compression unit of NS1=min{encryption key switching unit of NS1, LBA data size of NS1}=min{8 KiB, 4 KiB}=4 KiB. Accordingly, the compression unit for the namespace NS1 is 4 KiB.

On the other hand, compression unit of NS2=min{encryption key switching unit of NS2, LBA data size of NS2}=min{8 KiB, 16 KiB}=8 KiB. Accordingly, the compression unit for the namespace NS2 is 8 KiB.

As described above, according to the present embodiment, a larger compression unit can be set for the namespace NS2 in comparison with the case of fixing the compression unit to 4 KiB. Consequently, a higher compression efficiency can be achieved than that in the case of fixing the compression unit to 4 KiB.

The compression unit generation circuit 422a may preliminarily calculate a plurality of compression units corresponding to the respective namespaces, based on multiple pieces of namespace setting information corresponding to the respective namespaces, and hold the calculated compression units. In this case, if a write command is received from the host 2, the compression unit generation circuit 422a selects the compression unit corresponding to the write-destination namespace identified by NSID designated by the received write command, from among the held compression units. The compression unit generation circuit 422a then sets the selected compression unit in the compression circuit 406.

If a read command designating the NSID of the read-target namespace is received, the compression unit generation circuit 422b generates the compression unit corresponding to the read-target namespace, based on the namespace setting information on the read-target namespace. The compression unit generation circuit 422b then sets the generated compression unit in the decompression circuit 407. The compression unit set in the decompression circuit 407 is used to allow the decompression circuit 407 to determine whether or not the size of uncompressed data generated by the decompression circuit 407 matches the compression unit used to write the uncompressed data, i.e., the compression unit used to compress the write data item corresponding to the uncompressed data.

Next, the data writing process is described. In response to reception of the write command designating the namespace identifier NSID indicating the write-destination namespace, and the write-destination logical address, from the host 2, the controller 4 starts the data writing process.

The CPU 402 of the controller 4 outputs the namespace identifier NSID and the write-destination logical address to the encryption key management circuit 403, and outputs the namespace identifier NSID to the namespace setting information management circuit 421a. Furthermore, the CPU 402 obtains the write data item associated with the received write command, from the memory 22 of the host 2, and outputs the obtained write data item to the compression circuit 406.

The namespace setting information management circuit 421a identifies the namespace setting information corresponding to the NSID designated by the write command. The namespace setting information management circuit 421a outputs the identified namespace setting information to the compression unit generation circuit 422a. The output namespace setting information includes, for example, AlignmentGranularity, the number of encryption keys in the write-destination namespace, and the LBA data size of the write-destination namespace.

The compression unit generation circuit 422a generates the compression unit corresponding to the write-destination namespace designated by the write command, based on the output namespace setting information. The compression unit generation circuit 422a generates the compression unit, based on AlignmentGranularity, the number of encryption keys, and the LBA data size that are indicated by the namespace setting information. The compression unit generation circuit 422a sets the generated compression unit in the compression circuit 406.

As described above, the compression unit generation circuit 422a may preliminarily calculate a plurality of compression units corresponding to the respective namespaces, and hold the calculated compression units. In this case, the compression unit generation circuit 422a sets the compression unit corresponding to the write-destination namespace, in the compression circuit 406, by selecting the compression unit corresponding to the write-destination namespace from among the held compression units.

The compression circuit 406 compresses the received write data item using the set compression unit. Since the compression unit satisfies the constraint that the encryption key is not switched in the compression unit, the compression circuit 406 compresses data corresponding to one encryption key, and generates compressed data. The compression circuit 406 outputs the generated compressed data to the encryption circuit 408.

The encryption circuit 408 encrypts the compressed data output from the compression circuit 406, using the encryption key. The encryption circuit 408 obtains the encryption key from the encryption key management circuit 403. The encryption key management circuit 403 identifies the write-destination namespace, and the logical address range (LBA range) to which the write-destination logical address belongs, based on the NSID and the logical address that are designated by the received write command. The encryption key management circuit 403 then outputs, to the encryption circuit 408, the encryption key corresponding to the identified logical address range in the identified write-destination namespace. The encryption circuit 408 generates encrypted data by encrypting the compressed data using the output encryption key. The generated encrypted data is subjected to the error correction coding process by the ECC processing circuit 404, and is subsequently written into the non-volatile memory 5.

Next, the data reading process is described. In response to reception of the read command that designates the namespace identifier NSID indicating the read-target namespace where read-target data is written, and the read-target logical address corresponding to the read-target data, from the host 2, the controller 4 executes the data reading process.

The controller 4 reads the encrypted data that includes the read-target data, from the non-volatile memory 5. The read encrypted data is error-corrected by the ECC processing circuit 404, and is subsequently output to the decryption circuit 409. The decryption circuit 409 decrypts the encrypted data using a decryption key (here, an encryption key received from the encryption key management circuit 403). At this time, the encryption key management circuit 403 identifies the encryption key, based on the NSID and the logical address that are designated by the read command. The encryption key management circuit 403 outputs the identified encryption key to the decryption circuit 409. The decryption circuit 409 generates compressed data by decrypting the encrypted data. The decryption circuit 409 outputs the generated compressed data to the decompression circuit 407.

The namespace setting information management circuit 421b identifies the namespace setting information on the read-target namespace, based on the NSID designated by the received read command. The namespace setting information management circuit 421b outputs the identified namespace setting information to the compression unit generation circuit 422b.

The compression unit generation circuit 422b generates the compression unit corresponding to the read-target namespace, based on the namespace setting information output from the namespace setting information management circuit 421b. The generated compression unit is the same as the compression unit used at the time of writing data into the namespace. The compression unit generation circuit 422b outputs the generated compression unit to the decompression circuit 407.

The decompression circuit 407 decompresses the data (compressed data) decrypted by the decryption circuit 409, and generates uncompressed data. By extracting the read-target data from the uncompressed data, read data to be transferred to the host 2 is generated. After generation of the uncompressed data, the decompression circuit 407 determines whether or not the size of the generated uncompressed data matches the compression unit (i.e., the compression unit output from the compression unit generation circuit 422b) used at the time of compressing the write data item corresponding to the uncompressed data.

If the size of the uncompressed data does not match the compression unit used at the time of compressing the write data item corresponding to the uncompressed data, the decompression circuit 407 notifies the CPU 402 of occurrence of an error. Under control by the CPU 402, the controller 4 executes a process (error handling), such as re-execution of the data reading process.

If the size of the uncompressed data matches the compression unit used at the time of compressing the write data item corresponding to the uncompressed data, the controller 4 transmits the read-target data extracted from the uncompressed data, as read data, to the host 2.

Next, the namespace setting information is described. FIG. 8 shows an example of the namespace setting information managed in the memory system according to the first embodiment.

Multiple pieces of namespace setting information corresponding to the respective namespaces managed by the controller 4 are managed on a management table 461 in the namespace setting information management circuit 421. It is herein assumed that the namespaces NS1, NS2, and NS3 are managed in the memory system 3.

For example, the management table 461 holds the minimum access granularity, the number of encryption keys for the namespace NS1, the number of encryption keys for the namespace NS2, the number of encryption keys for the namespace NS3, the LBA data size of the namespace NS1, the LBA data size of the namespace NS2, and the LBA data size of the namespace NS3.

The minimum access granularity is a value indicating AlignmentGranularity. AlignmentGranularity is a value common to all the namespaces managed by the controller 4.

In a case where the namespace NS1 includes four LBA ranges, the number of encryption keys for the namespace NS1 is four.

In a case where the namespace NS2 includes only one global range, the number of encryption keys for the namespace NS2 is one.

In a case where the namespace NS3 includes only one global range, the number of encryption keys for the namespace NS3 is one.

The LBA data size of the namespace NS1 is, for example, 4 KiB.

The LBA data size of the namespace NS2 is, for example, 16 KiB.

The LBA data size of the namespace NS3 is, for example, 4 KiB.

The namespace setting information management circuit 421 outputs the minimum access granularity, the number of encryption keys for the namespace NS1, and the LBA data size of the namespace NS1, as the namespace setting information corresponding to the namespace NS1.

The namespace setting information management circuit 421 outputs the minimum access granularity, the number of encryption keys for the namespace NS2, and the LBA data size of the namespace NS2, as the namespace setting information corresponding to the namespace NS2.

The namespace setting information management circuit 421 outputs the minimum access granularity, the number of encryption keys for the namespace NS3, and the LBA data size of the namespace NS3, as the namespace setting information corresponding to the namespace NS3.

Next, the data writing process is described. FIG. 9 is a flowchart showing procedures of the data writing process executed in the memory system according to the first embodiment.

Upon reception of a write command from the host 2, the controller 4 receives a write data item from the host 2 (step S11). The write data item is data associated with the write command received from the host 2. The controller 4 receives the write data item, based on a data pointer indicating a position in the memory 22 designated by the received write command.

The controller 4 determines whether the compression unit corresponding to the write-destination namespace identified by the NSID designated by the received write command has already been generated or not (step S12). In a case where a plurality of compression units corresponding to the respective namespaces have preliminarily been calculated, the compression unit corresponding to the write-destination namespace has already been generated.

If the compression unit corresponding to the write-destination namespace has not been generated yet (NO in S12), the controller 4 executes a compression unit generating process for generating the compression unit corresponding to the write-destination namespace (step S13).

If the compression unit corresponding to the write-destination namespace has already been generated (YES in S12), the controller 4 skips the process of S13. The controller 4 obtains the compression unit corresponding to the write-destination namespace held by the compression unit generation circuit 422.

The controller 4 sets the compression unit corresponding to the write-destination namespace, in the compression circuit 406 (step S14).

The compression circuit 406 of the controller 4 compresses the write data item with respect to each compression unit, using the compression unit set in S14 (step S15). The compression circuit 406 of the controller 4 generates compressed data by compressing the write data item.

The encryption key management circuit 403 of the controller 4 identifies the encryption key corresponding to the write data item, and outputs the identified encryption key to the encryption circuit 408. The encryption circuit 408 of the controller 4 then encrypts the compressed data generated in S15 using the encryption key output from the encryption key management circuit 403 (step S16).

The controller 4 writes the encrypted data generated by encrypting the compressed data in S16, into the non-volatile memory 5 (step S17). At this time, the controller 4 manages the memory position in the non-volatile memory 5 where the encrypted data has been written in S17 (step S18).

As described above, the controller 4 compresses and encrypts the write data item, and subsequently writes it into the non-volatile memory 5 through the data writing process. Accordingly, the controller 4 can achieve effective use of the storage space of the non-volatile memory 5, and protection of the user data.

Next, the compression unit generating process is described. FIG. 10 is a flowchart showing procedures of the compression unit generating process executed in the memory system 3 according to the first embodiment.

The controller 4 executes an encryption key switching unit calculating process (step S131). The encryption key switching unit calculating process is a process of calculating the encryption key switching unit for the write-destination namespace, based on the namespace setting information (AlignmentGranularity, and the number of encryption keys) on the write-destination namespace. The encryption key switching unit is a unit for switching the encryption key in the write-destination namespace.

The controller 4 obtains the LBA data size of the write-destination namespace from the namespace setting information on the write-destination namespace (step S132).

The controller 4 generates, as the compression unit, a size of the smaller of the calculated encryption key switching unit and the obtained LBA data size (step S133).

The controller 4 then stores the generated compression unit as required (step S134).

As described above, the compression unit is generated based on the namespace setting information indicating the setting of the write-destination namespace so as to satisfy the constraint that the encryption key is not switched in the compression unit.

Next, the encryption key switching unit calculating process is described. FIG. 11 is a flowchart showing procedures of the encryption key switching unit calculating process executed in the memory system according to the first embodiment.

The controller 4 obtains AlignmentGranularity from the namespace setting information on the write-destination namespace (step S1311). Next, the controller 4 obtains the number of encryption keys of the write-destination namespace from the namespace setting information on the write-destination namespace (step S1312).

The controller 4 determines whether the number of encryption keys for the write-destination namespace is one or not (step S1313). That is, the controller 4 determines whether only the namespace global range is set in the write-destination namespace or not.

If the number of encryption keys for the write-destination namespace is one (YES in S1313), the controller 4 calculates infinity (e.g., the size of the write-destination namespace) as the encryption key switching unit of the write-destination namespace (step S1314).

If the number of encryption keys for the write-destination namespace is not one (NO in S1313), the controller 4 calculates AlignmentGranularity obtained in S21 as the encryption key switching unit of the write-destination namespace (step S1315).

Next, the data reading process is described. FIG. 12 is a flowchart showing procedures of the data reading process executed in the memory system 3 according to the first embodiment.

The controller 4 receives, from the host 2, the read command that designates the namespace identifier NSID indicating the read-target namespace where read-target data is written, and the read-target logical address corresponding to the read-target data (step S31).

The controller 4 reads the encrypted data that includes the read-target data, from the non-volatile memory 5 (step S32).

The controller 4 obtains the encryption key corresponding to the encrypted data read in S32, and sets the encryption key in the decryption circuit 409 of the controller 4 (step S33).

The decryption circuit 409 of the controller 4 decrypts the encrypted data read in S32, using the set encryption key (step S34).

The decompression circuit 407 of the controller 4 generates uncompressed data by decompressing the compressed data generated in S34 (step S35).

The decompression circuit 407 of the controller 4 determines whether or not the size of the data decompressed in S35, i.e., the size of the uncompressed data, matches the compression unit used at the time of compressing the write data item corresponding to the uncompressed data (step S36).

If the size of the uncompressed data matches the compression unit used at the time of compressing the write data item corresponding to the uncompressed data (YES in S36), the controller 4 extracts the read-target data from the uncompressed data, and transmits the extracted read-target data to the host 2 (step S37).

If the size of the uncompressed data does not match the compression unit used at the time of compressing the write data item corresponding to the uncompressed data (NO in S36), the controller 4 executes a process (error handling), such as re-execution of the data reading process (step S38).

As described above, the controller 4 reads the compressed and encrypted data from the non-volatile memory 5, through the data reading process, decrypts and decompresses it, and then transmits it to the host 2.

As described above, according to the first embodiment, the controller 4 generates the compression unit that is calculated based on the namespace setting information indicating setting of the write-destination namespace, and corresponds to this write-destination namespace. The compression unit has a size satisfying a constraint that the encryption key for encrypting data to be written into the write-destination namespace is not switched in the compression unit.

Consequently, for each namespace, the compression unit preferable for setting the namespace can be generated. Accordingly, with certain setting of the namespace, for example, a size larger than 4 KiB is used as the compression unit, and the constraint that the encryption key is not switched in the compression unit can be satisfied. As a result, without reduction in security, the effective capacity of the memory system 3 can be enhanced. The difference between the enhanced effective capacity and the nominal capacity of the memory system 3 can be used as, for example, an over-provisioning capacity. In this case, advantageous effects, such as improvement in performance of the memory system 3, lifetime extension of the memory system 3 due to reduction in write amplification factor (WAF), and reduction in power consumption due to reduction in the amount of writing into the non-volatile memory 5, can be achieved.

Second Embodiment

A second embodiment is described. The second configuration described above is applied to a memory system 3 according to the second embodiment. That is, in the memory system 3 according to the second embodiment, one encryption key is managed for each LBA range. It is then determined whether to extend the compression unit or not based on whether the LBA range (also called the first LBA range) to which the logical address designated by the latest write command received from the host 2 belongs matches the LBA range (also called the second LBA range) to which the logical address designated by the penultimate write command belongs or not.

In other words, the compression unit for data is separated at timing of switching the LBA range where the data is to be written. Accordingly, data items to be written into the same LBA range are compressed together, and data items to be written into LBA ranges different from each other are separately compressed.

Some of configuration elements included in the memory system 3 according to the second embodiment are the same as configuration elements of the memory system 3 according to the first embodiment. Accordingly, hereinafter, the memory system 3 according to the second embodiment is described with a focus on differences from the memory system 3 according to the first embodiment.

FIG. 13 shows examples of a data writing process and a data reading process executed in the memory system according to the second embodiment.

Here, the controller 4 of the memory system 3 according to the second embodiment further includes an LBA range checker 431.

The LBA range checker 431 is a logical address range check circuit that identifies the LBA range to which the logical address designated by the write command received from the host 2 belongs. The LBA range checker 431 identifies the write-destination LBA range, based on the NSID and the logical address (write-destination LBA) that are designated by the write command received from the host 2. The write-destination LBA range is an LBA range to which the logical address designated by the received write command belongs. The LBA range checker 431 outputs information indicating the identified LBA range to a compression unit generation circuit 432 and the encryption key management circuit 403.

The encryption key management circuit 403 is a circuit that manages a plurality of encryption keys associated in a one-to-one relationship respectively with a plurality of LBA ranges. The encryption key management circuit 403 outputs the encryption key corresponding to the LBA range output from the LBA range checker 431, to the encryption circuit 408 or the decryption circuit 409.

The controller 4 of the memory system 3 according to the second embodiment includes the compression unit generation circuit 432 instead of the compression unit generation circuit 422 in the first embodiment. The compression unit generation circuit 432 refers to each LBA range output from the LBA range checker 431, and determines whether the latest LBA range output by the LBA range checker 431 matches the penultimate LBA range output from the LBA range checker 431 or not. That is, the compression unit generation circuit 432 determines whether the LBA range to which the logical address designated by the latest write command received from the host 2 matches the LBA range to which the logical address designated by the penultimate write command received from the host 2 or not.

If the LBA range to which the logical address designated by the latest write command received from the host 2 belongs matches the LBA range to which the logical address designated by the penultimate write command received from the host 2 belongs, the compression unit generation circuit 432 extends the current size of the compression unit so that the write data item associated with the latest write command received from the host 2 can be compressed together with data that includes at least the write data item associated with the penultimate write command received from the host 2. That is, the current size of the compression unit is extended so that the write data item associated with the latest write command, and the data that includes at least the write data item associated with the penultimate write command received from the host 2 can be included in the same compression unit. In this case, the current size of the compression unit is increased by the size of the write data item associated with the latest write command.

On the other hand, if the LBA range to which the logical address designated by the latest write command received from the host 2 belongs does not match the LBA range to which the logical address designated by the penultimate write command received from the host 2 belongs, the compression unit generation circuit 432 generates (fixes) the current size of the compression unit as the compression unit so that the write data item associated with the latest write command received from the host 2, and the data that includes at least the write data item associated with the penultimate write command received from the host 2 can be separately compressed, and sets the generated compression unit in the compression circuit 406. That is, the current size of the compression unit is generated as the compression unit so that the write data item associated with the latest write command, and the data that includes at least the write data item associated with the penultimate write command received from the host 2 can be included respectively in compression units different from each other.

As described above, by executing the control of separating (fixing) the compression units for data at timing of switching the LBA range where the data is to be written, data items to be written into the same LBA range can be compressed together, and data items to be written into LBA ranges different from each other can be separately compressed.

After the latest write command (CMDn) is received, the compression unit generation circuit 432 waits for receiving the next write command (CMD(n+1)). Upon reception of the next write command (CMD(n+1)), the compression unit generation circuit 432 determines whether the LBA range to which the logical address designated by the received next write command (CMD(n+1)) belongs matches the LBA range to which the logical address designated by the previous write command (CMDn) belongs or not.

As described above, until the next write command (CMD (n+1)) is received, compression of the data that includes at least the write data item associated with the latest write command (CMDn) is not executed. If a large number of write commands designating the logical addresses belonging to the same LBA range are received, the number of compression units is sometimes too large.

Consequently, if the next write command CMD(n+1)) is not received before the time period elapsing after the latest write command (CMDn) is received from the host 2 reaches a predetermined time period, or if the extended compression unit reaches an upper limit value, the compression unit generation circuit 432 generates (fixes) the current size of the compression unit as the compression unit so that the data that includes at least the write data item associated with the latest write command (CMDn), and the write data item associated with the next write command (CMD(n+1)) can be separately compressed, and sets the generated compression unit in the compression circuit 406.

A compression unit holding circuit 433 is a circuit that holds each compression unit generated by the compression unit generation circuit 432. Similar to the first embodiment, each compression unit held by the compression unit holding circuit 433 is used to allow the decompression circuit 407 to determine whether or not the size of uncompressed data generated by the decompression circuit 407 matches the compression unit used to compress the write data item corresponding to the uncompressed data.

First, the data writing process is described. Hereinafter, a write command that designates the namespace identifier NSID indicating the write-destination namespace, and the write-destination logical address is described as an example. However, the write command does not necessarily include the NSID. This is because the configuration where one encryption key is managed for each LBA range is only required according to the second embodiment, thus negating the need to use the namespace.

In response to reception of the write command designating the namespace identifier NSID indicating the write-destination namespace, and the write-destination logical address, from the host 2, the controller 4 obtains the write data item associated with the write command from the memory 22 of the host 2, and starts the data writing process.

The LBA range checker 431 identifies the LBA range to which the logical address designated by the received write command belongs. The LBA range checker 431 outputs the information indicating the identified LBA range to the compression unit generation circuit 432. The LBA range checker 431 outputs the information indicating the identified LBA range, and the NSID designated by the received write command, to the encryption key management circuit 403.

The compression unit generation circuit 432 generates the compression unit to be used when the received write data item is compressed, based on the information indicating the LBA range output by the LBA range checker 431. If the latest LBA range output by the LBA range checker 431 is the same as the penultimate LBA range output by the LBA range checker 431, the compression unit generation circuit 432 extends the current size of the compression unit so that the write data item associated with the latest write command, and the data that includes at least the write data item associated with the penultimate write command can be included in the same compression unit. If the extended compression unit reaches the upper limit, the compression unit generation circuit 432 generates the current size of the compression unit as the compression unit to be used to compress the write data item. If a predetermined time period elapses after receiving the latest write command without receiving the next write command, the compression unit generation circuit 432 generates the current size of the compression unit as the compression unit to be used to compress the write data item.

If the latest LBA range is different from the penultimate LBA range, the compression unit generation circuit 432 generates the current size of the compression unit as the compression unit to be used to compress the write data item so that the write data item associated with the latest write command, and the data that includes at least the write data item associated with the penultimate write command can be included respectively in compression units different from each other.

The compression unit generation circuit 432 sets the generated compression unit in the compression circuit 406. The compression unit holding circuit 433 holds each compression unit generated by the compression unit generation circuit 432.

The compression circuit 406 generates compressed data by compressing the write data item using the set compression unit.

The encryption key management circuit 403 identifies the encryption key corresponding to the write data item, based on the LBA range output from the LBA range checker 431, and outputs the identified encryption key to the encryption circuit 408.

The encryption circuit 408 generates encrypted data by encrypting compressed data generated by the compression circuit 406, using the encryption key output from the encryption key management circuit 403. The generated encrypted data is subjected to the error correction coding process by the ECC processing circuit 404, and is subsequently written into the non-volatile memory 5.

Next, the data reading process is described. In response to reception of the read command that designates the namespace identifier NSID indicating the read-target namespace where read-target data is written, and the read-target logical address corresponding to the read-target data, from the host 2, the controller 4 executes the data reading process.

The controller 4 reads the encrypted data that includes the read-target data, from the non-volatile memory 5. The encrypted data read from the non-volatile memory 5 is error-corrected by the ECC processing circuit 404, and subsequently output to the decryption circuit 409. The decryption circuit 409 decrypts the encrypted data using a decryption key (here, an encryption key received from the encryption key management circuit 403). At this time, the LBA range checker 431 identifies the LBA range, based on the NSID and the logical address that are designated by the read command. The LBA range checker 431 then outputs the information indicating the identified LBA range, to the encryption key management circuit 403. The encryption key management circuit 403 identifies the decryption key, based on the output LBA range. The encryption key management circuit 403 outputs the identified decryption key to the decryption circuit 409. The decryption circuit 409 generates compressed data by decrypting the encrypted data. The decryption circuit 409 outputs the generated compressed data to the decompression circuit 407.

The decompression circuit 407 decompresses the data (compressed data) decrypted by the decryption circuit 409, and generates uncompressed data. By extracting the read-target data from the uncompressed data, read data to be transferred to the host 2 is generated. After the uncompressed data is generated, the decompression circuit 407 checks the size of the generated uncompressed data. In this case, the decompression circuit 407 determines whether or not the size of the generated uncompressed data matches the compression unit used to compress the write data item corresponding to the uncompressed data. For example, the compression unit used to compress the write data item corresponding to the uncompressed data may be notified from the compression unit holding circuit 433 to the decompression circuit 407. For example, in the compression unit holding circuit 433, information for identifying data included in the compression unit may be held with respect to each compression unit. Accordingly, the compression unit used to compress the write data item corresponding to the uncompressed data generated by the decompression circuit 407 can be identified based on, for example, the NSID and the logical address that are designated by the read command.

If the size of the uncompressed data does not match the compression unit used at the time of compressing the write data item corresponding to the uncompressed data, the decompression circuit 407 notifies the CPU 402 of occurrence of an error. Under control by the CPU 402, the controller 4 executes a process (error handling), such as re-execution of the data reading process.

If the size of the uncompressed data matches the compression unit used at the time of compressing the write data item corresponding to the uncompressed data, the controller 4 transmits the read-target data extracted from the uncompressed data, as read data, to the host 2.

Next, a first example of data compression for a plurality of write data items is described. FIG. 14 shows the first example of a compression process for a plurality of write data items executed in the memory system according to the second embodiment. Here, a case is assumed where the upper limit of the compression unit is larger than 8 KiB. A case is further assumed where the write commands CMD1, CMD2, CMD3, CMD4, and CMD5 are received in this order from the host 2.

The write command CMD1 designates, for example, a logical address included in the LBA range Rx, as the write-destination LBA. The write data item d1 associated with the write command CMD1 has, for example, a size of 4 KiB. An encryption key to be used to encrypt the write data item d1 is the encryption key Kx associated with the LBA range Rx.

The write command CMD2 designates, for example, a logical address included in the LBA range Ry, as the write-destination LBA. The write data item d2 associated with the write command CMD2 has, for example, a size of 4 KiB. An encryption key to be used to encrypt the write data item d2 is the encryption key Ky associated with the LBA range Ry.

The write command CMD3 designates, for example, the logical address included in the LBA range Rz, as the write-destination LBA. The write data item d3 associated with the write command CMD3 has, for example, a size of 4 KiB. An encryption key to be used to encrypt the write data item d3 is the encryption key Kz associated with the LBA range Rz.

The write command CMD4 designates, for example, the logical address included in the LBA range Rz, as the write-destination LBA. The write data item d4 associated with the write command CMD4 has, for example, a size of 4 KiB. An encryption key to be used to encrypt the write data item d4 is the encryption key Kz associated with the LBA range Rz.

The write command CMD5 designates, for example, a logical address included in the LBA range Rw, as the write-destination LBA. The write data item d5 associated with the write command CMD5 has, for example, a size of 4 KiB. An encryption key to be used to encrypt the write data item d5 is the encryption key Kw associated with the LBA range Rw.

First, the controller 4 receives the first write command CMD1 from the host 2.

Next, the controller 4 receives the second write command CMD2 from the host 2. The write-destination LBA of the write data item d2 associated with the write command CMD2 belongs to the LBA range Ry. The write-destination LBA of the write data item d1 associated with the penultimate write command CMD1 belongs to the LBA range Rx. Accordingly, the compression units for data are separated at the boundary between the write data items d1 and d2 so that the write data items d1 and d2 can be included respectively in compression units different from each other. As a result, for compression of the write data item d1, the compression unit indicating 4 KiB, which is the size of the write data item d1, is used.

The controller 4 receives the third write command CMD3 from the host 2. The write-destination LBA of the write data item d3 associated with the write command CMD3 belongs to the LBA range Rz. The write-destination LBA of the write data item d2 associated with the write command CMD2 belongs to the LBA range Ry. Accordingly, the compression units for data are separated at the boundary between the write data items d2 and d3 so that the write data items d2 and d3 can be included respectively in compression units different from each other. As a result, for compression of the write data item d2, the compression unit indicating 4 KiB, which is the size of the write data item d2, is used.

Next, the controller 4 receives the fourth write command CMD4 from the host 2. The write-destination LBA of the data item d4 associated with the write command CMD4 belongs to the LBA range Rz that is the same LBA range to which the write-destination LBA of the write data item d3 associated with the write command CMD3 belongs. Accordingly, the compression unit is extended so that the write data items d3 and d4 can be included in the same compression unit. In this case, the current size of the compression unit is extended from 4 KiB, which is the size of the write data item d3, to 8 KiB, which is the sum of the size of the write data item d3 and the size of the write data item d4.

The controller 4 receives the fifth write command CMD5 from the host 2. The write-destination LBA of the write data item d5 associated with the write command CMD5 belongs to the LBA range Rw. The write-destination LBA of the write data item d4 associated with the write command CMD4 belongs to the LBA range Rz. Accordingly, the compression units for data are separated at the boundary between the write data items d4 and d5 so that the write data items d4 and d5 can be included respectively in compression units different from each other. As a result, for compression of data that includes the write data items d3 and d4, the extended compression unit of 8 KiB is used. The write data items d3 and d4 are then compressed together.

Subsequently, if a predetermined time period elapses without reception of a write command subsequent to the write command CMD5, the controller 4 executes compression of the write data item d5 using the compression unit indicating 4 KiB.

Next, a second example of data compression for a plurality of write data items is described. FIG. 15 shows the second example of compression of a plurality of write data items executed in the memory system according to the second embodiment. It is herein assumed that the upper limit of the compression unit is 16 KiB or more, and a plurality of write commands designating logical addresses included in the same LBA range are consecutively received.

The write command CMD11 designates the logical address included in the LBA range Rz, as the write-destination LBA. The write data item d11 associated with the write command CMD11 has a size of 4 KiB. An encryption key to be used to encrypt the write data item d11 is the encryption key Kz.

The write command CMD12 designates the logical address included in the LBA range Rz, as the write-destination LBA. The write data item d12 associated with the write command CMD12 has a size of 4 KiB. An encryption key to be used to encrypt the write data item d12 is the encryption key Kz.

The write command CMD13 designates the logical address included in the LBA range Rz, as the write-destination LBA. The write data item d13 associated with the write command CMD13 has a size of 4 KiB. An encryption key to be used to encrypt the write data item d13 is the encryption key Kz.

The write command CMD14 designates the logical address included in the LBA range Rz, as the write-destination LBA. The write data item d14 associated with the write command CMD14 has a size of 4 KiB. An encryption key to be used to encrypt the write data item d14 is the encryption key Kz.

The write command CMD15 designates the logical address included in the LBA range Rw, as the write-destination LBA. The write data item d15 associated with the write command CMD15 has a size of 4 KiB. An encryption key to be used to encrypt the write data item d15 is the encryption key Kw.

First, the controller 4 receives the first write command CMD11 from the host 2.

Next, the controller 4 receives the second write command CMD12 from the host 2. The write-destination LBA of the write data item d12 associated with the write command CMD12 belongs to the LBA range Rz that is the same LBA range to which the write-destination LBA of the write data item d11 associated with the write command CMD11 belongs. Accordingly, the current size of the compression unit is extended from 4 KiB, which is the size of the write data item d11, to 8 KiB, which is the sum of the size of the write data item d11 and the size of the write data item d12, so that the write data items d11 and d12 can be included in the same compression unit.

The controller 4 receives the third write command CMD13 from the host 2. The write-destination LBA of the write data item d13 associated with the write command CMD13 belongs to the LBA range Rz that is the same LBA range to which the write-destination LBA of the write data item d12 associated with the write command CMD12 belongs. Accordingly, the current size of the compression unit is extended from 8 KiB to 12 KiB, which is the sum of the size of the write data item d11, the size of the write data item d12, and the size of the write data item d13, so that the write data items d11, d12, and d13 can be included in the same compression unit.

Next, the controller 4 receives the fourth write command CMD14 from the host 2. The write-destination LBA of the data item d14 associated with the write command CMD14 belongs to the LBA range Rz that is the same LBA range to which the write-destination LBA of the write data item d13 associated with the write command CMD13 belongs. Accordingly, the size of the compression unit is extended from 12 KiB to 16 KiB, which is the sum of the size of the write data item d11, the size of the write data item d12, the size of the write data item d13, and the size of the write data item d14, so that the write data items d11, d12, d13, and d14 can be included in the same compression unit.

The controller 4 receives the fifth write command CMD15 from the host 2. The write-destination LBA of the write data item d15 associated with the write command CMD15 belongs to the LBA range Rw. The write-destination LBA of the write data item d14 associated with the write command CMD14 belongs to the LBA range Rz. Accordingly, the compression units are separated at the boundary between the write data items d14 and d15 so that the write data items d14 and d15 can be included respectively in compression units different from each other. As a result, for compression of data that includes the write data items d11, d12, d13, and d14, the compression unit indicating 16 KiB is used. The write data items d11, d12, d13, and d14 are then compressed together.

Subsequently, if a predetermined time period elapses without reception of a write command subsequent to the write command CMD5, the controller 4 executes compression of the write data item d15 using the compression unit indicating 4 KiB.

Next, a third example of data compression for a plurality of write data items is described. FIG. 16 shows the third example of compression of a plurality of write data items executed in the memory system according to the second embodiment. It is herein assumed that the upper limit of the compression unit is 16 KiB or more, and a plurality of write commands respectively designating logical addresses included in the same LBA range are consecutively received. In this case, basically, the compression unit may be extended so that all the write data items associated with these write commands can be included in the same compression unit. However, control of not compressing the write data item associated with at least the last write command among these write commands may be executed.

The write commands CMD11 to CMD15 shown in FIG. 16 are the same as the respective write commands CMD11 to CMD15 described with reference to FIG. 15.

Referring to FIG. 16, upon reception of the write command CMD15, the controller 4 determines that the LBA range Rw to which the logical address designated by the write command CMD15 belongs is different from the LBA range Rz to which the LBA designated by the write command CMD14 belongs.

At this time, the compression unit generation circuit 422 subtracts 4 KiB from the compression unit indicating 16 KiB so that at least the write data item d14 cannot be included in the same compression unit as that for the write data item d11. At this time, control may be made so that not only the write data item d14 but also other write data items (e.g., the write data item d13 etc.) cannot be included in the same compression unit as that for the write data item d11.

The compression circuit 406 compresses the write data items d11, d12, and d13 together, and generates compressed data.

The write data item d14 is not compressed and is encrypted by the encryption circuit 408, and is subsequently written into the non-volatile memory 5.

As described above, if the LBA range to which the logical address designated by the latest write command (the write command CMD15 in FIG. 16) received from the host 2 belongs does not match the LBA range to which the logical address designated by the penultimate write command (the write command CMD14 in FIG. 16) received from the host 2 belongs, the controller 4 performs control that does not compress the write data item (d14) associated with the penultimate write command (write command CMD14) among the data items (d11 to d14) that at least include the write data item (d14) associated with the penultimate write command (write command CMD14). In a case where a plurality of write commands designating the same LBA range are consecutively received from the host 2, a sufficiently large compression unit can be used. Consequently, even if the write data item of at least one write command is not compressed, a sufficiently high compression efficiency can be achieved.

Next, procedures of the data writing process are described. FIG. 17A is a flowchart showing part of procedures of the data writing process executed in the memory system 3 according to the second embodiment. FIG. 17B is a flowchart showing the remaining procedures of the data writing process executed in the memory system 3 according to the second embodiment.

First, the controller 4 receives a write data item d(i) from the host 2 (step S401). The write data item d(i) is a write data item associated with an i-th write command received from the host 2.

The LBA range checker 431 of the controller 4 identifies the LBA range R(d(i)) to which the write-destination LBA of the write data item d(i) received in S401 belongs (step S402). The LBA range R(d(i)) is an LBA range to which the logical address designated by the i-th write command belongs.

The controller 4 determines whether or not the write data item d(i+1) has been received within a predetermined time period after reception of the write data item d(i) (step S403). The write data item d(i+1) is a write data item associated with an (i+1)-th write command received from the host 2. In other words, the controller 4 determines whether or not the (i+1)-th write command has been received from the host 2 within the predetermined time period after reception of the i-th write command.

If the write data item d(i+1) has been received within the predetermined time period after reception of the write data item d(i), i.e., if the (i+1)-th write command has been received within the predetermined time period after reception of the i-th write command (YES in S403), the controller 4 identifies the LBA range R(d(i+1)) to which the write-destination LBA of the write data item d(i+1) belongs (step S404).

The controller 4 determines whether or not the LBA range R(d(i+1)) of the write data item d(i+1) identified in S404 matches the LBA range R(d(i)) of the write data item d(i) identified in S402 (step S405).

If the write data item d(i+1) has not been received within the predetermined time period after reception of the write data item d(i) (NO in S403), the controller 4 skips procedures in S404 and S405, and fixes the compression unit (step S406). The controller 4 then generates the fixed compression unit, and outputs it to the compression circuit 406.

If the LBA range R(d(i+1)) of the write data item d(i+1) identified in S404 does not match the LBA range R(d(i)) of the write data item d(i) identified in S402 (NO in step S405), the controller 4 fixes the compression unit (step S406). The controller 4 then generates the fixed compression unit, and outputs it to the compression circuit 406.

The controller 4 compresses data that has the size of the compression unit fixed in S406, i.e., data including at least the write data item d(i) (step S407). For example, if the LBA range R(d(i)) of the write data item d(i) matches the LBA range R(d(i−1)) of the write data item d(i−1), the data including at least the write data item d(i) is data including the write data item d(i) and the write data item d(i−1).

The controller 4 initializes the current size of the compression unit, and returns the current size of the compression unit to the initial value (step S408). The initial value is, for example, 4 KiB.

The controller 4 encrypts the compressed data compressed in S407, using the encryption key (step S409).

The controller 4 writes the encrypted data encrypted in S409 into the non-volatile memory 5 (step S410).

The controller 4 manages the memory position in the non-volatile memory 5 where the encrypted data has been written in S410 (step S411).

The controller 4 increments i by one, and sets i to i+1 (step S412).

The controller 4 determines whether the condition of YES in S403 has been satisfied or not (step S413).

If YES in S403 (YES in S413), the controller 4 returns the processing to S403, and determines whether the write data item subsequent to the write data item having already been received is received or not. Since i has already been incremented, in S403 the controller 4 determines whether or not the write data item d(i+2) has been received within the predetermined time period after reception of the write data item d(i+1).

If NO in S403 (NO in S413), the controller 4 returns the processing to S401, and receives the write data item subsequent to the data item having been written into the non-volatile memory 5. Since i has already been incremented, in S401 the controller 4 receives the first write data item, i.e., the write data item d(i+1), subsequent to the data item having been written into the non-volatile memory 5.

On the other hand, if the LBA range R(d(i+1)) of the write data item d(i+1) identified in S404 matches the LBA range R(d(i)) of the write data item d(i) identified in S402 (YES in step S405), the controller 4 extends the current size of the compression unit by the size of the write data item d(i+1) so that the data including at least the write data item d(i), and the write data item d(i+1) can be included in the same compression unit (step S414 in FIG. 17B).

The controller 4 determines whether the current size of the compression unit extended in S414 reaches the upper limit value or not (step S415).

If the current size of the compression unit extended in S414 reaches the upper limit value (YES in S415), the controller 4 fixes the current size of the compression unit as the compression unit (step S416). The controller 4 outputs the fixed compression unit to the compression circuit 406.

The controller 4 compresses data that has the size of the compression unit fixed in S416, i.e., data including at least the write data item d(i), and the write data item d(i+1) (step S417). For example, if the LBA range R(d(i)) of the write data item d(i) matches the LBA range R(d(i−1)) of the write data item d(i−1), the data including at least the write data item d(i) is data including the write data item d(i) and the write data item d(i−1). Consequently, in this case, the write data item d(i−1), the write data item d(i), and the write data item d(i+1) are compressed together.

The controller 4 initializes the current size of the compression unit, and returns the current size of the compression unit to the initial value (step S418).

The controller 4 encrypts the compressed data compressed in S417, using the encryption key (step S419).

The controller 4 writes the encrypted data encrypted in S419 into the non-volatile memory 5 (step S420).

The controller 4 manages the memory position in the non-volatile memory 5 where the encrypted data has been written in S420 (step S421).

The controller 4 increments i by two, and sets i to i+2 (step S422). The controller 4 then returns the processing to S401, and receives the write data item subsequent to the data item having been written into the non-volatile memory 5.

If the compression unit extended in S414 does not reach the upper limit value (NO in S415), the controller 4 increments i by one, and sets i to i+1 (step S423). The controller 4 then returns the processing to S403, and determines whether the write data item subsequent to the write data item having already been received is received or not.

As described above, according to the second embodiment, similar to the first embodiment, the constraint that the encryption key is not switched in the compression unit is satisfied while a larger size is used as the compression unit.

Third Embodiment

A third embodiment is described. The third configuration described above is applied to a memory system 3 according to the third embodiment. That is, in the memory system 3 according to the third embodiment, one encryption key is managed for each namespace. Based on whether the NSID designated by the latest write command received from the host 2 matches the NSID designated by the penultimate write command or not, it is determined whether to extend the compression unit or not.

In other words, the compression unit for data is separated at timing of switching the namespace where the data is to be written. Accordingly, data items to be written into the same namespace are compressed together, and data items to be written into namespaces different from each other are separately compressed.

Almost all configuration elements included in the memory system 3 according to the third embodiment are the same as those of the memory system 3 according to the second embodiment. Accordingly, description is made with a focus on differences from the memory system 3 according to the second embodiment.

The third embodiment assumes a case where each of the namespaces managed by the memory system 3 includes only one LBA range. The number of encryption keys used in one namespace is one. That is, the controller 4 manages a plurality of encryption keys associated in one-to-one relationship with the respective namespaces.

FIG. 18 shows examples of a data writing process and a data reading process executed in the memory system 3 according to the third embodiment.

Here, if the NSID designated by the latest write command received from the host 2 matches the NSID designated by the penultimate write command received from the host 2, a compression unit generation circuit 441 in the third embodiment extends the current size of the compression unit so that the write data item associated with the latest write command received from the host 2 can be compressed together with data that includes at least the write data item associated with the penultimate write command received from the host 2. That is, the current size of the compression unit is extended so that the write data item associated with the latest write command, and the data that includes at least the write data item associated with the penultimate write command received from the host 2 can be included in the same compression unit. In this case, the current size of the compression unit is increased by the size of the write data item associated with the latest write command.

On the other hand, if the NSID designated by the latest write command received from the host 2 is different from the NSID designated by the penultimate write command received from the host 2, the compression unit generation circuit 441 generates (fixes) the current size of the compression unit as the compression unit so that the write data item associated with the latest write command received from the host 2, and the data that includes at least the write data item associated with the penultimate write command received from the host 2 can be separately compressed, and sets the generated compression unit in the compression circuit 406. That is, the current size of the compression unit is generated as the compression unit so that the write data item associated with the latest write command, and the data that includes at least the write data item associated with the penultimate write command received from the host 2 can be included respectively in compression units different from each other.

As described above, by executing the control of separating (fixing) the compression units for data at timing of switching the namespace where the data is to be written, data items to be written into the same namespace can be compressed together, and data items to be written into namespaces different from each other can be separately compressed.

If the next write command is not received after the time period elapsing after reception of the latest write command from the host 2 reaches the predetermined time period, or if the extended compression unit reaches the upper limit value, the compression unit generation circuit 441 generates the current compression unit, as the compression unit to be used to compress data that includes the write data item associated with the latest write command.

A compression unit holding circuit 442 is a circuit that holds each compression unit generated by the compression unit generation circuit 441. Similar to the first embodiment, each compression unit held by the compression unit holding circuit 442 is used to allow the decompression circuit 407 to determine whether or not the size of uncompressed data generated by the decompression circuit 407 matches the compression unit used to compress the write data item corresponding to the uncompressed data.

First, the data writing process is described. In response to reception of the write command designating the namespace identifier NSID indicating the write-destination namespace, and the write-destination logical address, from the host 2, the controller 4 starts the data writing process.

If the NSID designated by the latest write command received from the host 2 matches the NSID designated by the penultimate write command received from the host 2, the compression unit generation circuit 441 extends the current size of the compression unit so that the write data item associated with the latest write command, and data including at least the write data item associated with the penultimate write command can be included in the same compression unit. If the extended compression unit reaches the upper limit, the compression unit generation circuit 441 generates the current compression unit as the compression unit to be used to compress the write data item. If a predetermined time period elapses after receiving the latest write command without receiving the next write command, the compression unit generation circuit 441 generates the current size of the compression unit as the compression unit to be used to compress the write data item.

If the NSID designated by the latest write command received from the host 2 is different from the NSID designated by the penultimate write command received from the host 2, the compression unit generation circuit 441 generates the current size of the compression unit, as the compression unit to be used to compress the write data item, so that the write data item associated with the latest write command, and data including at least the write data item associated with the penultimate write command can be included respectively in compression units different from each other.

The compression unit generation circuit 441 sets the generated compression unit in the compression circuit 406. The compression unit holding circuit 442 holds each compression unit generated by the compression unit generation circuit 441.

The compression circuit 406 generates compressed data by compressing the write data item using the set compression unit.

The encryption key management circuit 403 identifies the encryption key corresponding to the write data item, based on the NSID designated by the write command received from the host 2, and outputs the identified encryption key to the encryption circuit 408.

The encryption circuit 408 generates encrypted data by encrypting compressed data generated by the compression circuit 406, using the encryption key output from the encryption key management circuit 403. The generated encrypted data is subjected to the error correction coding process by the ECC processing circuit 404, and is subsequently written into the non-volatile memory 5.

Next, the data reading process is described. In response to reception of the read command that designates the namespace identifier NSID indicating the read-target namespace where read-target data is written, and the read-target logical address corresponding to the read-target data, from the host 2, the controller 4 executes the data reading process.

The controller 4 reads the encrypted data that includes the read-target data, from the non-volatile memory 5. The read encrypted data is error-corrected by the ECC processing circuit 404, and is subsequently output to the decryption circuit 409. The decryption circuit 409 decrypts the encrypted data using a decryption key (here, an encryption key received from the encryption key management circuit 403). At this time, the encryption key management circuit 403 identifies the decryption key, based on the NSID designated by the read command received from the host 2. The encryption key management circuit 403 outputs the identified decryption key to the decryption circuit 409. The decryption circuit 409 generates compressed data by decrypting the encrypted data. The decryption circuit 409 outputs the generated compressed data to the decompression circuit 407.

The decompression circuit 407 decompresses the data (compressed data) decrypted by the decryption circuit 409, and generates uncompressed data. By extracting the read-target data from the uncompressed data, read data to be transferred to the host 2 is generated. After the uncompressed data is generated, the decompression circuit 407 checks the size of the generated uncompressed data. In this case, the decompression circuit 407 determines whether or not the size of the generated uncompressed data matches the compression unit used to compress the write data item corresponding to the uncompressed data. For example, the compression unit used to compress the write data item corresponding to the uncompressed data may be notified from the compression unit holding circuit 442 to the decompression circuit 407. For example, in the compression unit holding circuit 442, information for identifying data included in the compression unit may be held with respect to each compression unit. Accordingly, the compression unit used to compress the write data item corresponding to the uncompressed data generated by the decompression circuit 407 can be identified based on, for example, the NSID and the logical address that are designated by the read command.

If the size of the uncompressed data does not match the compression unit used at the time of compressing the write data item corresponding to the uncompressed data, the decompression circuit 407 notifies the CPU 402 of occurrence of an error. Under control by the CPU 402, the controller 4 executes a process (error handling), such as re-execution of the data reading process.

Next, a first example of data compression for a plurality of write data items is described. FIG. 19 shows the first example of a compression process for a plurality of write data items executed in the memory system according to the third embodiment. Here a case is assumed where the upper limit of the compression unit is 8 KiB or more. A case is further assumed where the write commands CMD1, CMD2, CMD3, CMD4, and CMD5 are received in this order from the host 2.

The write command CMD1 designates the NSID(Nx) of the write-destination namespace Nx, and the logical address included in the write-destination namespace Nx. The write data item d1 associated with the write command CMD1 has, for example, a size of 4 KiB. An encryption key to be used to encrypt the write data item d1 is the encryption key Kx associated with the write-destination namespace Nx.

The write command CMD2 designates the NSID(Ny) of the write-destination namespace Ny, and the logical address included in the write-destination namespace Ny. The write data item d2 associated with the write command CMD2 has, for example, a size of 4 KiB. An encryption key to be used to encrypt the write data item d2 is the encryption key Ky associated with the write-destination namespace Ny.

The write command CMD3 designates the NSID(Nz) of the write-destination namespace Nz, and the logical address included in the write-destination namespace Nz. The write data item d3 associated with the write command CMD3 has, for example, a size of 4 KiB. An encryption key to be used to encrypt the write data item d3 is the encryption key Kz associated with the write-destination namespace Nz.

The write command CMD4 designates the NSID(Nz) of the write-destination namespace Nz, and the logical address included in the write-destination namespace Nz. The write data item d4 associated with the write command CMD4 has, for example, a size of 4 KiB. An encryption key to be used to encrypt the write data item d4 is the encryption key Kz associated with the write-destination namespace Nz.

The write command CMD5 designates the NSID(Nw) of the write-destination namespace Nw, and the logical address included in the write-destination namespace Nw. The write data item d5 associated with the write command CMD5 has, for example, a size of 4 KiB. An encryption key to be used to encrypt the write data item d5 is the encryption key Kw associated with the write-destination namespace Nw.

First, the controller 4 receives the first write command CMD1 from the host 2.

Next, the controller 4 receives the second write command CMD2 from the host 2. The write-destination namespace NSID of the write data item d2 associated with the write command CMD2 is the NSID(Ny), and the write-destination namespace NSID of the write data item d1 associated with the write command CMD1 is NSID(Nx). Accordingly, the compression units for data are separated at the boundary between the write data items d1 and d2 so that the write data items d1 and d2 can be included respectively in compression units different from each other. As a result, for compression of the write data item d1, the compression unit indicating 4 KiB, which is the size of the write data item d1, is used.

The controller 4 receives the third write command CMD3 from the host 2. The write-destination namespace NSID of the write data item d3 associated with the write command CMD3 is the NSID(Nz), and the write-destination namespace NSID of the write data item d2 associated with the write command CMD2 is NSID(Ny). Accordingly, the compression units for data are separated at the boundary between the write data items d2 and d3 so that the write data items d2 and d3 can be included respectively in compression units different from each other. Accordingly, for compression of the write data item d2, the compression unit indicating 4 KiB, which is the size of the write data item d2, is used.

Next, the controller 4 receives the fourth write command CMD4 from the host 2. The NSID of the write-destination namespace of the data item d4 associated with the write command CMD4 is the NSID(Nz), which is the same as the NSID of the write-destination namespace of the write data item d3 associated with the write command CMD3. Accordingly, the compression unit is extended so that the write data items d3 and d4 can be included in the same compression unit. In this case, the current size of the compression unit is extended from 4 KiB, which is the size of the write data item d3, to 8 KiB, which is the sum of the size of the write data item d3 and the size of the write data item d4.

The controller 4 receives the fifth write command CMD5 from the host 2. The write-destination namespace NSID of the write data item d5 associated with the write command CMD5 is the NSID(Nw), and the write-destination namespace NSID of the write data item d4 associated with the write command CMD4 is NSID(Nz). Accordingly, the compression units for data are separated at the boundary between the write data items d4 and d5 so that the write data items d4 and d5 can be included respectively in compression units different from each other. As a result, for compression of data that includes the write data items d3 and d4, the compression unit indicating 8 KiB, which is the sum of the write data items d3 and d4, is used. The write data items d3 and d4 are then compressed together.

Subsequently, if a predetermined time period elapses without reception of a write command subsequent to the write command CMD5, the controller 4 executes compression of the write data item d5 using the compression unit indicating 4 KiB.

Next, a second example of data compression for a plurality of write data items is described. FIG. 20 shows the second example of compression of a plurality of write data items executed in the memory system according to the third embodiment. It is herein assumed that the upper limit of the compression unit is 16 KiB or more, and a plurality of write commands designating the NSID of the same write-destination namespace are consecutively received.

The write command CMD11 designates the NSID(Nz) of the write-destination namespace Nz, and the logical address included in the write-destination namespace Nz. The write data item d11 associated with the write command CMD11 has, for example, a size of 4 KiB. An encryption key to be used to encrypt the write data item d11 is the encryption key Kz associated with the write-destination namespace Nz.

The write command CMD12 designates the NSID(Nz) of the write-destination namespace Nz, and the logical address included in the write-destination namespace Nz. The write data item d12 associated with the write command CMD12 has, for example, a size of 4 KiB. An encryption key to be used to encrypt the write data item d12 is the encryption key Kz associated with the write-destination namespace Nz.

The write command CMD13 designates the NSID(Nz) of the write-destination namespace Nz, and the logical address included in the write-destination namespace Nz. The write data item d13 associated with the write command CMD13 has, for example, a size of 4 KiB. An encryption key to be used to encrypt the write data item d13 is the encryption key Kz associated with the write-destination namespace Nz.

The write command CMD14 designates the NSID(Nz) of the write-destination namespace Nz, and the logical address included in the write-destination namespace Nz. The write data item d14 associated with the write command CMD14 has, for example, a size of 4 KiB. An encryption key to be used to encrypt the write data item d14 is the encryption key Kz associated with the write-destination namespace Nz.

The write command CMD15 designates the NSID(Nw) of the write-destination namespace Nw, and the logical address included in the write-destination namespace Nw. The write data item d15 associated with the write command CMD15 has, for example, a size of 4 KiB. An encryption key to be used to encrypt the write data item d15 is the encryption key Kw associated with the write-destination namespace Nw.

First, the controller 4 receives the first write command CMD11 from the host 2.

Next, the controller 4 receives the second write command CMD12 from the host 2. The NSID of the write-destination namespace of the write data item d12 associated with the write command CMD12 is the NSID(Nz), which is the same as the NSID of the write-destination namespace of the write data item d11 associated with the write command CMD11. Accordingly, the compression unit is extended to 8 KiB so that the write data items d11 and d12 can be included in the same compression unit.

The controller 4 receives the third write command CMD13 from the host 2. The NSID of the write-destination namespace of the write data item d13 associated with the write command CMD13 is the NSID(Nz), which is the same as the NSID of the write-destination namespace of the write data item d12 associated with the write command CMD12. Accordingly, the compression unit is extended to 12 KiB so that the write data items d11, d12, and d13 can be included in the same compression unit.

Next, the controller 4 receives the fourth write command CMD14 from the host 2. The NSID of the write-destination namespace of the data item d14 associated with the write command CMD14 is the NSID(Nz), which is the same as the NSID of the write-destination namespace of the write data item d13 associated with the write command CMD13. Accordingly, the compression unit is extended to 16 KiB so that the write data items d11, d12, d13, and d14 can be included in the same compression unit.

The controller 4 receives the fifth write command CMD15 from the host 2. The write-destination namespace NSID of the write data item d15 associated with the write command CMD15 is the NSID(Nw), and the write-destination namespace NSID of the write data item d14 associated with the write command CMD14 is NSID(Nz). Accordingly, the compression units for data are separated at the boundary between the write data items d14 and d15 so that the write data items d14 and d15 can be included respectively in compression units different from each other. As a result, for compression of data that includes the write data items d11, d12, d13, and d14, the compression unit indicating 16 KiB is used. The write data items d11, d12, d13, and d14 are then compressed together.

Subsequently, if a predetermined time period elapses without reception of a write command subsequent to the write command CMD5, the controller 4 executes compression of the write data item d15 using the compression unit indicating 4 KiB.

Next, a third example of data compression for a plurality of write data items is described. FIG. 21 shows the third example of compression of a plurality of write data items executed in the memory system according to the third embodiment. It is herein assumed that the upper limit of the compression unit is 16 KiB or more, and a plurality of write commands designating the same namespace identifier are consecutively received. In this case, basically, the compression unit may be extended so that all the write data items associated with these write commands can be included in the same compression unit. However, control of not compressing the write data item associated with at least the latest write command among these write commands may be executed.

The write commands CMD11 to CMD15 shown in FIG. 21 are the same as the respective write commands CMD11 to CMD15 described with reference to FIG. 20.

Referring to FIG. 21, upon reception of the write command CMD15, the controller 4 determines that the NSID (Nw) designated by the write command CMD15 is different from the NSID(Nz) designated by the write command CMD14.

At this time, the controller 4 subtracts 4 KiB from the compression unit indicating 16 KiB so that at least the write data item d14 cannot be included in the same compression unit as that for the write data item d11. At this time, control may be made so that not only the write data item d14 but also other write data items (e.g., the write data item d13 etc.) cannot be included in the same compression unit as that for the write data item d11.

The compression circuit 406 compresses the write data items d11, d12, and d13 together, and generates compressed data.

The write data item d14 is not compressed and is encrypted by the encryption circuit 408.

Next, procedures of the data writing process are described. FIG. 22A is a flowchart showing part of procedures of the data writing process executed in the memory system 3 according to the third embodiment. FIG. 22B is a flowchart showing the remaining procedures of the data writing process executed in the memory system 3 according to the third embodiment.

First, the controller 4 receives a write data item d(i) from the host 2 (step S501). The write data item d(i) is a write data item associated with an i-th write command received from the host 2.

Based on the namespace identifier designated by the i-th write command received from the host 2, the controller 4 identifies the NSID(d(i)) of the write-destination namespace of the write data item d(i) received in S501 (step S502).

The controller 4 determines whether or not the write data item d(i+1) has been received within a predetermined time period after reception of the write data item d(i) (step S503). The write data item d(i+1) is a write data item associated with an (i+1)-th write command received from the host 2. In other words, the controller 4 determines whether or not the (i+1)-th write command has been received from the host 2 within the predetermined time period after reception of the i-th write command.

If the write data item d(i+1) has been received within the predetermined time period after reception of the write data item d(i), i.e., if the (i+1)-th write command has been received within the predetermined time period after reception of the i-th write command (YES in S503), the controller 4 identifies the NSID(d(i+1)) of the write-destination namespace of the write data item d(i+1) (step S504).

The controller 4 determines whether or not the NSID(d(i+1)) of the write-destination namespace of the write data item d(i+1) identified in S504 matches the NSID(d(i)) of the write-destination namespace identified in S502 (step S505).

If the write data item d(i+1) has not been received within the predetermined time period after reception of the write data item d(i) (NO in S503), the controller 4 skips procedures in S504 and S505, and fixes the compression unit (step S506). The controller 4 generates the fixed compression unit, and outputs it to the compression circuit 406.

Also if the NSID(d(i+1)) of the write-destination namespace of the write data item d(i+1) identified in S504 does not match the NSID(d(i)) of the write-destination namespace identified in S502 (NO in S505), the controller 4 fixes the compression unit (step S506). The controller 4 generates the fixed compression unit, and outputs it to the compression circuit 406.

The controller 4 compresses data that has the size of the compression unit fixed in S506, i.e., data including at least the write data item d(i) (step S507). For example, if the NSID(d(i)) of the write-destination namespace of the write data item d(i) matches the NSID(d(i−1)) of the write-destination namespace of the write data item d(i−1), the data including at least the write data item d(i) is data including the write data items d(i) and d(i−1).

The controller 4 initializes the current size of the compression unit, and returns the current size of the compression unit to the initial value (step S508). The initial value is, for example, 4 KiB.

The controller 4 encrypts the compressed data compressed in S507, using the encryption key (step S509).

The controller 4 writes the encrypted data encrypted in S509 into the non-volatile memory 5 (step S510).

The controller 4 manages the memory position in the non-volatile memory 5 where the encrypted data has been written in S510 (step S511).

The controller 4 increments i by one, and sets i to i+1 (step S512).

The controller 4 determines whether the condition of YES in S503 has been satisfied or not (step S513).

If YES in S503 (YES in S513), the controller 4 returns the processing to S503, and determines whether the write data item subsequent to the write data item having already been received is received or not. Since i has already been incremented, in S503 the controller 4 determines whether or not the write data item d(i+2) has been received within the predetermined time period after reception of the write data item d(i+1).

If NO in S503 (NO in S513), the controller 4 returns the processing to S501, and receives the write data item subsequent to the data item having been written into the non-volatile memory 5. Since i has already been incremented, in S501 the controller 4 receives the first write data item, i.e., the write data item d(i+1), subsequent to the data item having been written into the non-volatile memory 5.

On the other hand, if the NSID(d(i+1)) of the write-destination namespace of the write data item d(i+1) identified in S504 matches the NSID(d(i)) of the write-destination namespace of the write data item d(i) identified in S502 (YES in step S505), the controller 4 extends the current size of the compression unit by the size of the write data item d(i+1) so that the data including at least the write data item d(i), and the write data item d(i+1) can be included in the same compression unit (step S514 in FIG. 22B).

The controller 4 determines whether the current size of the compression unit extended in S514 reaches the upper limit value or not (step S515).

If the current size of the compression unit extended in S514 reaches the upper limit value (YES in S515), the controller 4 fixes the current size as the compression unit for data (step S516). The controller 4 generates the fixed compression unit, and outputs it to the compression circuit 406.

The controller 4 compresses data that has the size of the compression unit fixed in S516, i.e., data including at least the write data item d(i), and the write data item d(i+1) (step S517). For example, if the NSID(d(i)) of the write-destination namespace of the write data item d(i) matches the NSID(d(i−1)) of the write-destination namespace of the write data item d(i−1), the data including at least the write data item d(i) is data including the write data items d(i) and d(i−1). Consequently, in this case, the write data item d(i−1), the write data item d(i), and the write data item d(i+1) are compressed together.

The controller 4 initializes the current size of the compression unit, and returns the current size of the compression unit to the initial value (step S518).

The controller 4 encrypts the compressed data compressed in S517, using the encryption key (step S519).

The controller 4 writes the encrypted data encrypted in S519 into the non-volatile memory 5 (step S520).

The controller 4 manages the memory position in the non-volatile memory 5 where the encrypted data has been written in S520 (step S521).

The controller 4 increments i by two, and sets i to i+2 (step S522). The controller 4 then returns the processing to S501, and receives the write data item subsequent to the data item having been written into the non-volatile memory 5.

If the compression unit extended in S514 does not reach the upper limit value (NO in S515), the controller 4 increments i by one, and sets i to i+1 (step S523). The controller 4 then returns the processing to S503, and determines whether the write data item subsequent to the write data item having already been received is received or not.

As described above, according to the third embodiment, similar to the first embodiment, the constraint that the encryption key is not switched in the compression unit is satisfied while a larger size is used as the compression unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a non-volatile memory; and
a controller having circuitry configured to
manage a plurality of namespaces, and control the non-volatile memory, the namespaces being used by the host to access the memory system,
compress a write data item received from the host to create compressed data, encrypt the compressed data with an encryption key to generate encrypted data to be written into the non-volatile memory, determine, for each of the namespaces, a compression unit that is a unit of compression of the write data item, determine a first compression unit in response to a write command that designates a namespace identifier of a write-destination namespace from the host, wherein a size of the first compression unit is calculated based on first namespace setting information corresponding to the write-destination namespace, and having a size of an encryption key switch unit that satisfies a constraint that an encryption key to encrypt data to be written into the write-destination namespace is not switched in the first compression unit, and compress data specified by the write command according to the first compression unit.

2. The memory system of claim 1, wherein the controller is further configured to preliminarily calculate a plurality of compression units corresponding to respective namespaces, based on multiple pieces of namespace setting information corresponding to the respective namespaces, and hold the plurality of calculated compression units, and set the first compression unit by selection of the first compression unit from among the plurality of compression units in response to reception of the write command from the host.

3. The memory system of claim 1, wherein the controller is further configured to obtain, from the first namespace setting information, a data size of the write-destination namespace per logical address included in a logical address space, and calculate, as the first compression unit, a size of a smaller of the calculated encryption key switch unit and the obtained data size.

4. The memory system of claim 1, wherein the controller is further configured to decrypt the encrypted data read from the non-volatile memory, using the encryption key used to encrypt the compressed data, generate uncompressed data via a decompression of decrypted data, and determine whether a size of the uncompressed data matches the compression unit used to compress the write data item corresponding to the uncompressed data.

5. The memory system of claim 1, wherein the controller is a memory controller and the circuitry comprising a system-on-a-chip.

6. The memory system of claim 1, wherein the non-volatile memory comprises a NAND-type flash memory.

7. A memory system connectable to a host, comprising:

a non-volatile memory; and a controller having circuitry configured to manage a plurality of encryption keys, and control the non-volatile memory, the plurality of encryption keys being associated in a one-to-one relationship respectively with a plurality of logical address ranges set in a logical address space used by the host to access the memory system, compress a write data item associated with a write command received from the host to create compressed data, encrypt the compressed data to generate encrypted data using an encryption key, of the plurality of encryption keys, associated with the logical address range to which a logical address designated by the write command belongs, the encrypted data to be written into the non-volatile memory, identify a logical address range, of the plurality of logical address ranges, to which the logical address designated by the received write command belongs, every time the write command is received from the host, determine a compression unit that is a unit of compression of the write data item, determine whether a first logical address range to which a first logical address designated by the latest write command belongs matches a second logical address range to which a second logical address designated by the penultimate write command belongs or not, in response to the first logical address matching the second logical address range, extend a current size of the compression unit such that a first write data item associated with a latest write command received from the host is compressed with data at least including a second write data item associated with a penultimate write command received from the host, and wait to receive a next write command from the host, and in response to the first logical address not matching the second logical address range, determine the current size of the compression unit as the compression unit so that the first write data item, and the data at least including the second write data item are separately compressed, and set the generated compression unit, and wait for receipt of the next write command from the host.

8. The memory system of claim 7, wherein the controller is further configured to generate a current size of the compression unit so that data at least including the first write data item, and the write data item associated with the next write command are separately compressed, and set a size of the generated compression unit, if the next write command is not received within a predetermined time period after the latest write command is received, or if the extended compression unit reaches an upper limit.

9. The memory system of claim 7, wherein the controller is further configured to prevent compression of at least the penultimate write data item in the data at least including the penultimate write data item, if the first logical address range does not match the second logical address range.

10. The memory system of claim 7, wherein the controller is further configured to decrypt the encrypted data read from the non-volatile memory, using the encryption key used to encrypt the compressed data, generate uncompressed data via decompression of decrypted data, and determine whether a size of the uncompressed data matches the compression unit used to compress the write data item corresponding to the uncompressed data.

11. The memory system of claim 7, wherein the controller is a memory controller and the circuitry comprising a system-on-a-chip.

12. The memory system of claim 7, wherein the non-volatile memory comprises a NAND-type flash memory.

13. A memory system connectable to a host, comprising:

a non-volatile memory; and controller having circuitry configured to manage a plurality of namespaces, control the non-volatile memory, the plurality of namespaces being used by the host to access the memory system, and manage a plurality of encryption keys associated in a one-to-one relationship respectively with the plurality namespaces, compress a write data item associated with a write command received from the host to create compressed data;

encrypt the compressed data to generate encrypted data using the encryption key associated with the namespace in which the write data item is to be written, the encrypted data to be written into the non-volatile memory, determine a compression unit that is a unit of compressing the write data item, determine whether a first namespace identifier designated by the latest write command matches a second namespace identifier designated by the penultimate write command or not, and in response to the first namespace identifier matching the second namespace identifier, extend a current size of the compression unit so that a first write data item associated with a latest write command received from the host is compressed with data at least including a second write data item associated with a penultimate write command received from the host, and wait to receive a next write command from the host, and in response to the first namespace identifier not matching the second namespace identifier, determine the current size of the compression unit as the compression unit so that the first write data item, and the data at least including the second write data item are separately compressed, and set the generated compression unit, and wait for receipt of the next write command from the host.

14. The memory system of claim 13, wherein the controller is configured to determine a current size of the compression unit as the compression unit so that data at least including the first write data item, and the write data item associated with the next write command are separately compressed, and set the generated compression unit, if the next write command is not received within a predetermined time period after the latest write command is received, or if the extended compression unit reaches an upper limit.

15. The memory system of claim 13, wherein the controller is further configured to prevent compression of at least the second write data item in the data at least including the second write data item, if the first namespace identifier does not match the second namespace identifier.

16. The memory system of claim 13, wherein the controller is further configured to decrypt the encrypted data read from the non-volatile memory, using the encryption key used to encrypt the compressed data, generate uncompressed data via decompression of decrypted data, and determine whether a size of the uncompressed data matches the compression unit used to compress the write data item corresponding to the uncompressed data.

17. The memory system of claim 13, wherein:

the controller is a memory controller and the circuitry comprising a system-on-a-chip; and the non-volatile memory comprises a NAND-type flash memory.

18. A control method of controlling the memory system according to claim 1.

19. A control method of controlling the memory system according to claim 7.

20. A control method of controlling the memory system of claim 13.

* * * * *